(12) United States Patent
Sugita

(10) Patent No.: US 9,297,985 B2
(45) Date of Patent: Mar. 29, 2016

(54) ZOOM LENS AND IMAGE-PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 13/928,579

(22) Filed: Jun. 27, 2013

(65) Prior Publication Data

US 2014/0002908 A1    Jan. 2, 2014

(30) Foreign Application Priority Data

Jun. 29, 2012    (JP) .................... 2012-146654

(51) Int. Cl.
*G02B 13/04*    (2006.01)
*G02B 15/177*   (2006.01)

(52) U.S. Cl.
CPC .............. *G02B 13/04* (2013.01); *G02B 15/177* (2013.01)

(58) Field of Classification Search
CPC ........ G02B 13/04; G02B 13/06; G02B 13/08; G02B 13/003; G02B 13/18; G02B 21/02; G02B 15/177; G02B 9/34; G02B 17/08
USPC ......... 359/682, 716, 648, 680, 671, 720, 781, 359/691, 728, 717, 708, 762, 749–753, 793, 359/782, 794
See application file for complete search history.

(56) References Cited

U.S. PATENT DOCUMENTS

| 5,654,830 | A  | * | 8/1997  | Shibata .................. 359/692 |
| 2004/0004772 | A1 |   | 1/2004  | Ohashi et al. |
| 2008/0144189 | A1 | * | 6/2008  | Iwasawa et al. ............. 359/686 |
| 2009/0284642 | A1 |   | 11/2009 | Ichikawa |
| 2010/0149657 | A1 |   | 6/2010  | Kuroda |
| 2010/0194930 | A1 | * | 8/2010  | Miyazaki et al. .......... 348/240.3 |
| 2010/0202063 | A1 |   | 8/2010  | Yamada et al. |
| 2010/0265595 | A1 | * | 10/2010 | Tochigi et al. ............... 359/682 |

(Continued)

FOREIGN PATENT DOCUMENTS

| CN | 1402037 A | 3/2003 |
| CN | 101038368 A | 9/2007 |

(Continued)

OTHER PUBLICATIONS

German Office Action issued in corresponding application No. 102013212401.5 on Sep. 10, 2013.

(Continued)

*Primary Examiner* — Thomas K Pham
*Assistant Examiner* — Jie Lie
(74) *Attorney, Agent, or Firm* — Carter, DeLuca, Farrell & Schmidt, LLP

(57) ABSTRACT

A zoom lens includes, in order from an object side to an image side, a first lens unit having a negative refractive power, a rear lens group having a positive refractive power as a whole and including at least one lens unit. An interval between the first lens unit and the rear lens group at the telephoto end is smaller than that at the wide angle end. The first lens unit includes a first aspheric lens having a positive aspheric amount, and a second aspheric lens having a negative aspheric amount on the image side of the first aspheric lens. The predetermined conditional expressions are satisfied.

12 Claims, 13 Drawing Sheets

(56) References Cited

U.S. PATENT DOCUMENTS

| | | |
|---|---|---|
| 2011/0026131 A1 | 2/2011 | Ito |
| 2011/0109974 A1 | 5/2011 | Sato |
| 2012/0113312 A1 | 5/2012 | Yanai et al. |
| 2012/0120501 A1 | 5/2012 | Katayose et al. |
| 2012/0206627 A1* | 8/2012 | Reshidko et al. .......... 348/240.2 |

FOREIGN PATENT DOCUMENTS

| | | |
|---|---|---|
| DE | 10312492 A1 | 10/2003 |
| JP | 2000-019392 A | 1/2000 |
| JP | 2002-244044 A | 8/2002 |
| JP | 2005-106878 A | 4/2005 |
| JP | 2005-208566 A | 8/2005 |
| JP | 2006-106109 A | 4/2006 |
| JP | 2008-046208 A | 2/2008 |
| JP | 2008-233284 A | 10/2008 |
| JP | 2010-217535 A | 9/2010 |
| JP | 2011-022380 A | 2/2011 |
| JP | 2011-102871 A | 5/2011 |
| JP | 2012-008268 A | 1/2012 |
| JP | 2012-008271 A | 1/2012 |
| JP | 2012-220681 A | 11/2012 |

OTHER PUBLICATIONS

Great Britain Office Action issued in corresponding application No. 1311444.2 on Jan. 7, 2014.

Chinese Office Action issued in corresponding application No. 201310267886.1 on Feb. 28, 2015.

Japanese office action issued in corresponding application No. 2012-146654 on Aug. 25, 2015.

* cited by examiner

ZOOM LENS AND IMAGE-PICKUP APPARATUS

BACKGROUND OF THE INVENTION

1. Field of the Invention

The present invention relates to a zoom lens suitable, for example, for an image-pickup optical system for an image-pickup apparatus, such as a digital still camera and a video camera.

2. Description of the Related Art

A small and wide angle-of-view zoom lens is demanded for an image-pickup optical system for an image-pickup apparatus. A negative lead type zoom lens is known as a wide angle-of-view zoom lens in which a lens unit having a negative refractive power is arranged on a side closest to the object.

Japanese Patent Laid-Open No. ("JP") 2005-106878 discloses a zoom lens that includes a first lens unit having a negative refractive power, a second lens unit having a positive refractive power, a third lens unit having a positive refractive power, and a fourth lens unit having a negative refractive power, and has an angle of view of 120° at a wide angle end and a zoom ratio of about 2.

JP 2008-046208 discloses a zoom lens that includes a first lens unit having a negative refractive power, a second lens unit of a positive refractive power, a third lens unit having a negative refractive power, and a fourth lens unit having a positive refractive power, and an angle of view of 106° at a wide angle end and a zoom ratio of about 2.1.

JP 2008-233284 includes a zoom lens that includes a first lens unit having a negative refractive power and a second lens unit having a positive refractive power, and has an angle of view of 113° at a wide angle end and a zoom ratio of about 1.7°.

U.S. Patent Publication No. ("US") 2011/0109974 discloses a fixed focal length lens (single focus lens) having an angle of view of about 127°.

In order to realize a small and wide angle-of-view zoom lens having a well-corrected distortion, it is important to properly set a lens structure of each lens, a refractive power of each lens unit, a zoom type etc. For example, in order to lessen the distortion utilizing an aspheric lens, it is important to properly set a position of an aspheric surface, a lens surface shape to which the aspheric shape is applied, and an aspheric amount, etc. in an optical system. The aspheric amount being, for example, a value describing the maximum deviation from a reference spherical surface in the normal direction. The reference spherical surface being the spherical surface that passes through a surface vertex and outermost circumferential part of a light effective diameter.

SUMMARY OF THE INVENTION

The present invention provides a wide angle-of-view zoom lens that can obtain a high optical performance in an overall zoom range, and an image-pickup apparatus having the same.

A zoom lens according to the present invention includes, in order from an object side to an image side, a first lens unit having a negative refractive power, a rear lens group having a positive total refractive power and comprising at least one lens unit configured to have an interval between the first lens unit and the rear lens group at the telephoto end of the zoom lens smaller than that at the wide angle end of the zoom lens. The first lens unit comprises a first aspheric lens located furthest towards the object side and having an aspheric surface having a positive aspheric amount, and a second aspheric lens located on the image side of the first aspheric lens having an aspheric surface with a negative aspheric amount. The following conditional expressions are satisfied:

$$0.50 < R1/BLD1 < 2.50$$

$$0.30 < D12/BLD1 < 0.80$$

where R1 denotes a radius of curvature of a lens surface closest to the object side of the first aspheric lens, D12 denotes an interval along the optical axis from the aspheric surface of the first aspheric lens to the aspheric surface of the second aspheric lens, and BLD1 denotes the length of the first lens unit.

Further features of the present invention will become apparent from the following description of exemplary embodiments with reference to the attached drawings.

DESCRIPTION OF THE EMBODIMENTS

A detailed description will be given of an embodiment of the present invention with reference to be the accompanying drawings. A zoom lens according to the present invention includes, in order from an object side to an image side, a first lens unit having a negative refractive power, and a rear lens group including at least one lens and having a positive refractive power as a whole. An interval distance between the first lens unit and the rear lens group at the telephoto end is smaller than that at the wide angle end. The first lens unit includes a first aspheric lens having a positive aspheric amount on the side closest to the object, and a second aspheric lens having a negative aspheric amount on the image side of the first aspheric lens.

Figure 1:
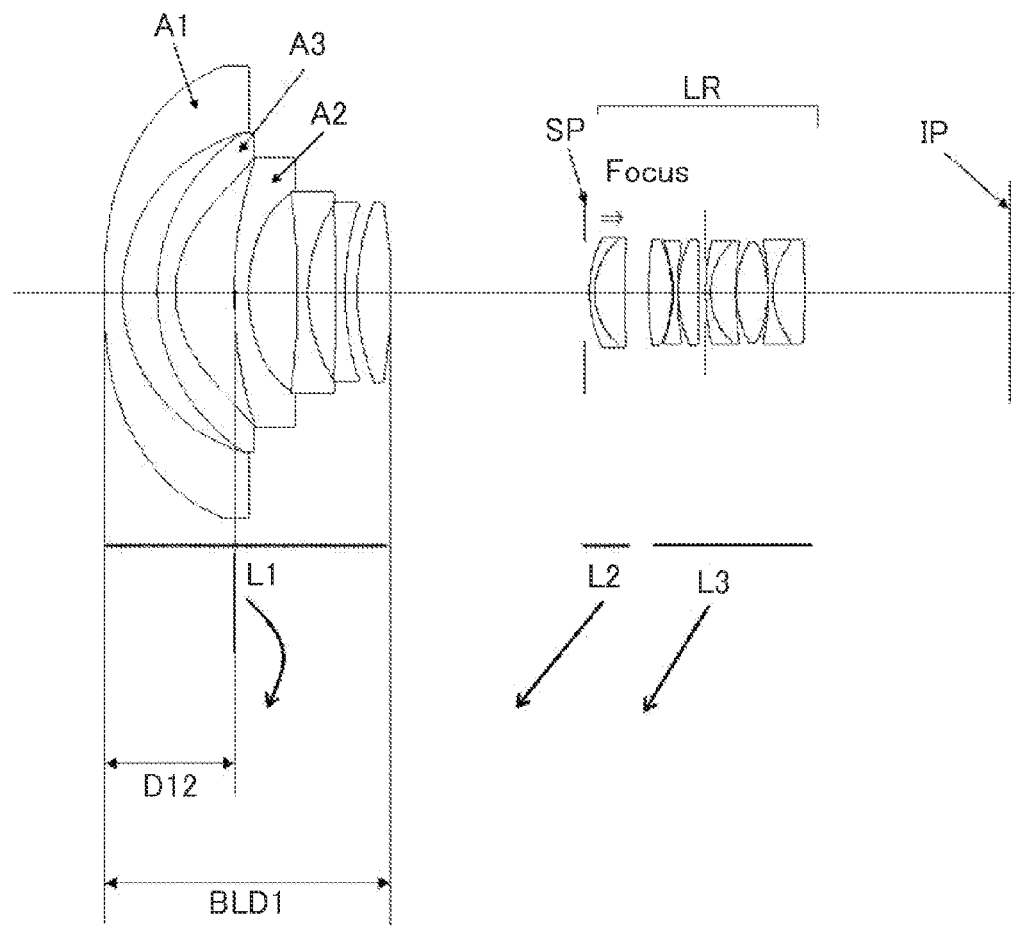
FIG. 1 is a sectional view of a zoom lens according to a first embodiment of the present invention.
Figure 2A:
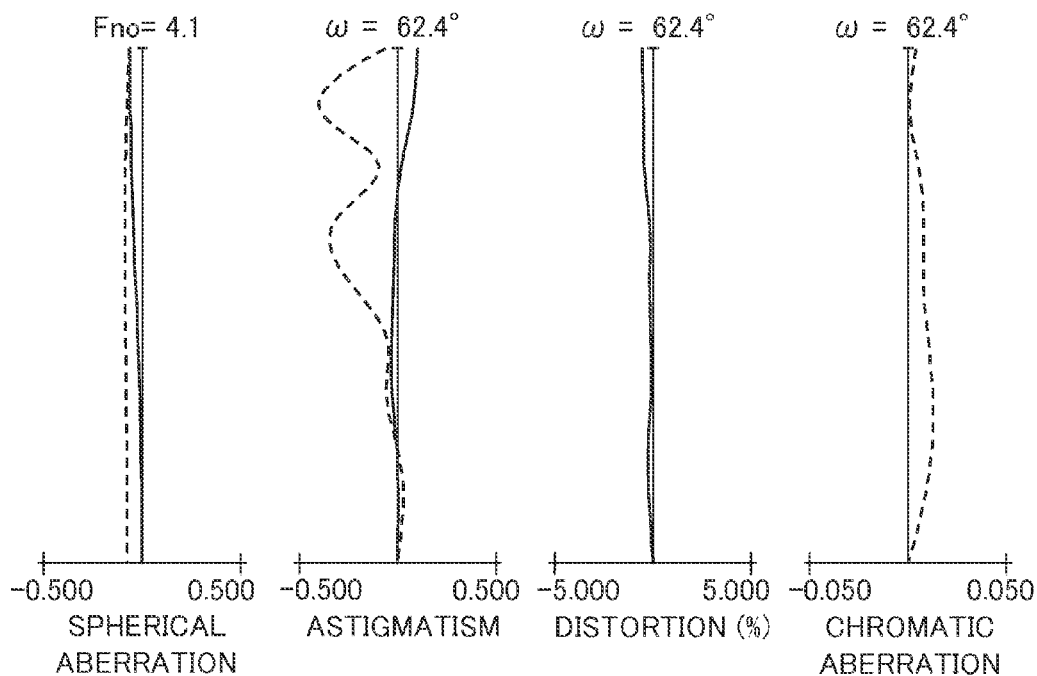
FIGS. 2A and 2B are aberrational diagrams at a wide angle end and a telephoto end in the zoom lens for an object at infinity according to the first embodiment of the present invention.
Figure 2B:
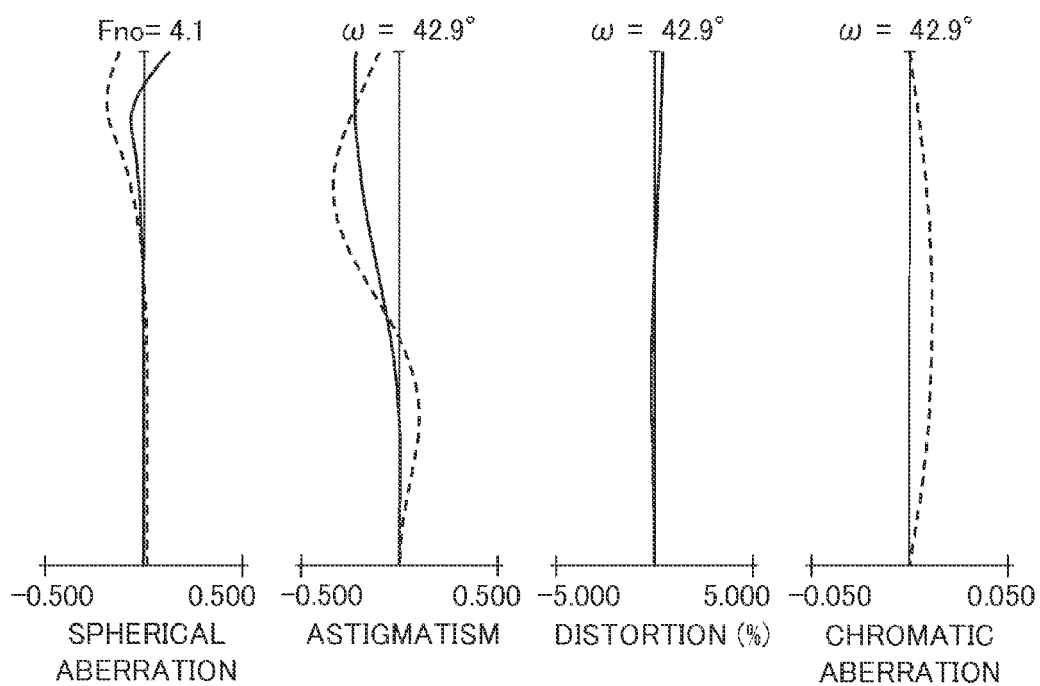
Figure 3:
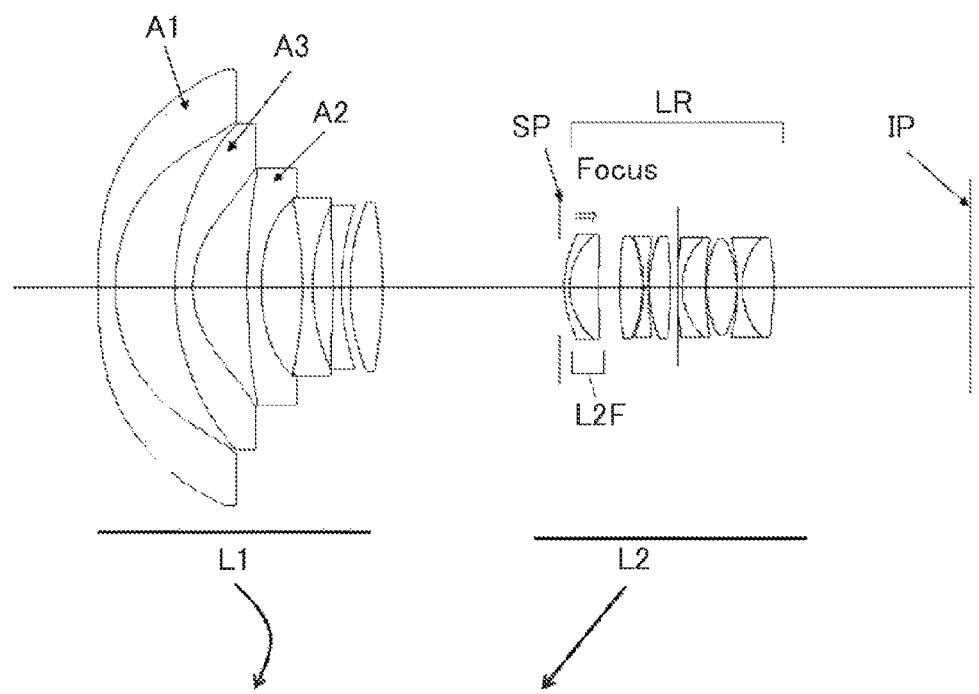
FIG. 3 is a sectional view of a zoom lens according to a second embodiment of the present invention.
Figure 4A:
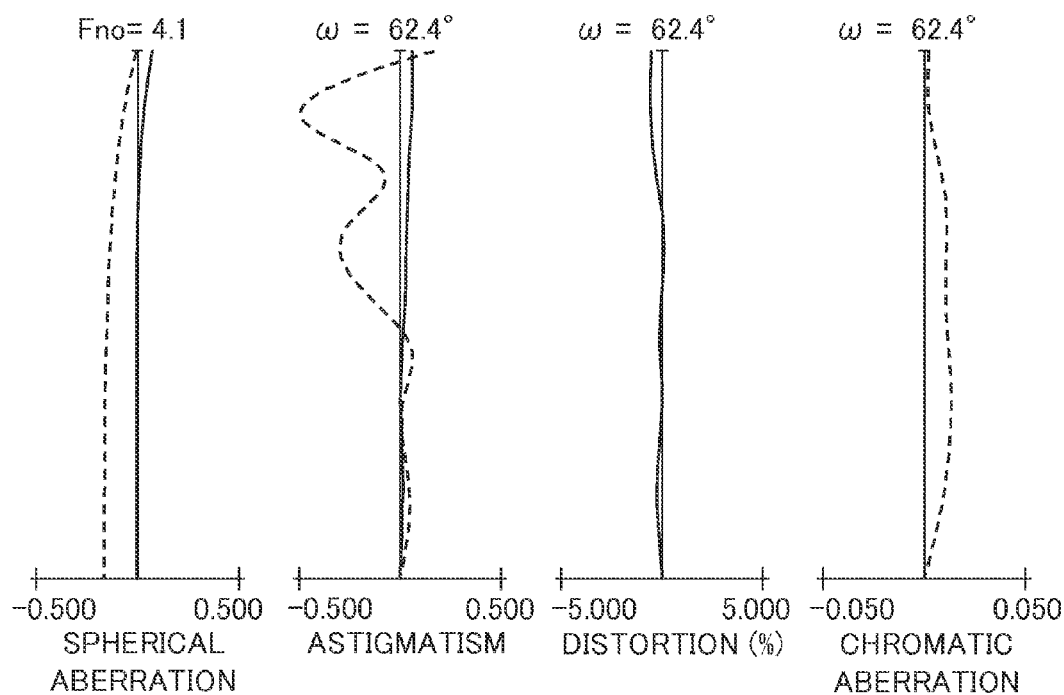
FIGS. 4A and 4B are aberrational diagrams at a wide angle end and a telephoto end in the zoom lens for an object at infinity according to the second embodiment of the present invention.
Figure 4B:
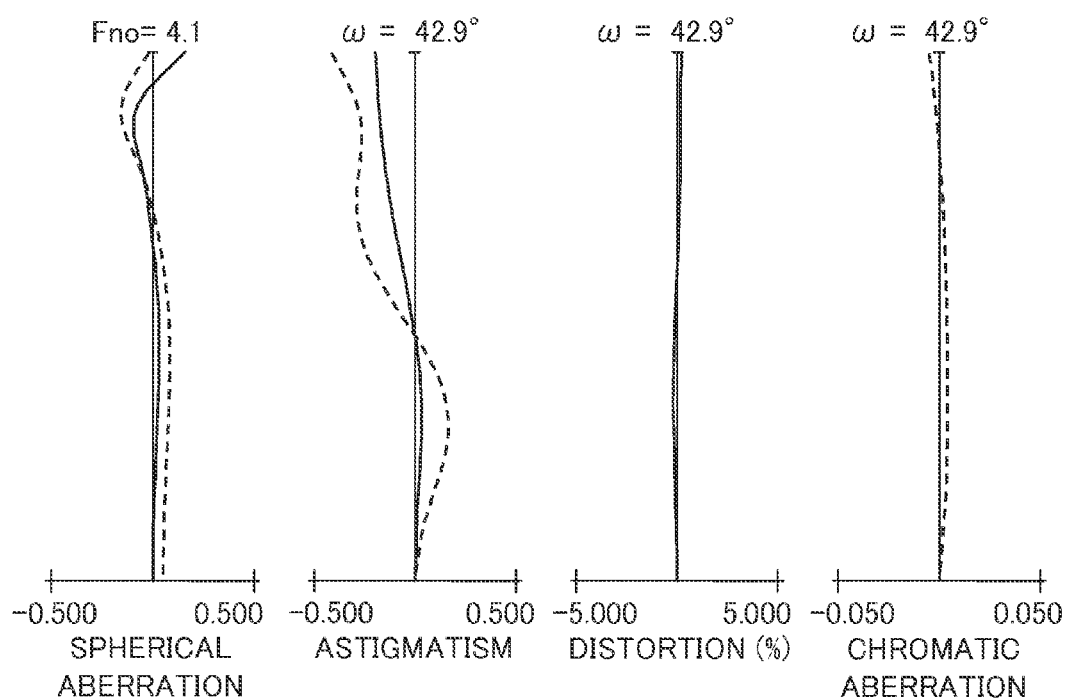
Figure 5:
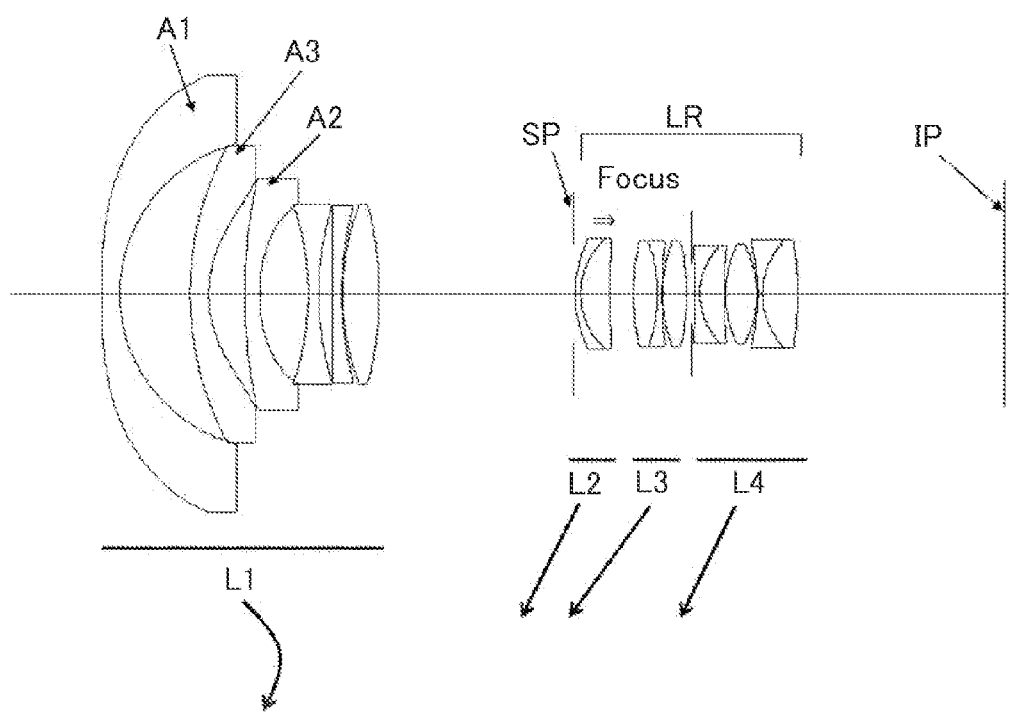
FIG. 5 is a sectional view of a zoom lens according to a third embodiment of the present invention.
Figure 6A:
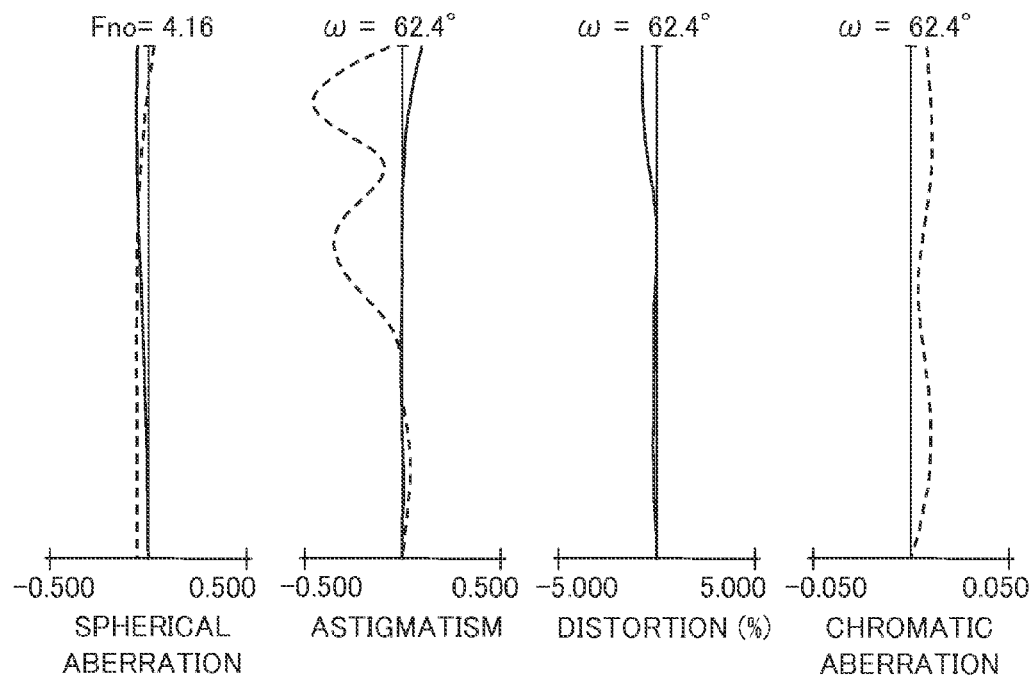
FIGS. 6A and 6B are aberrational diagrams at a wide angle end and a telephoto end in the zoom lens for an object at infinity according to the third embodiment of the present invention.
Figure 6B:
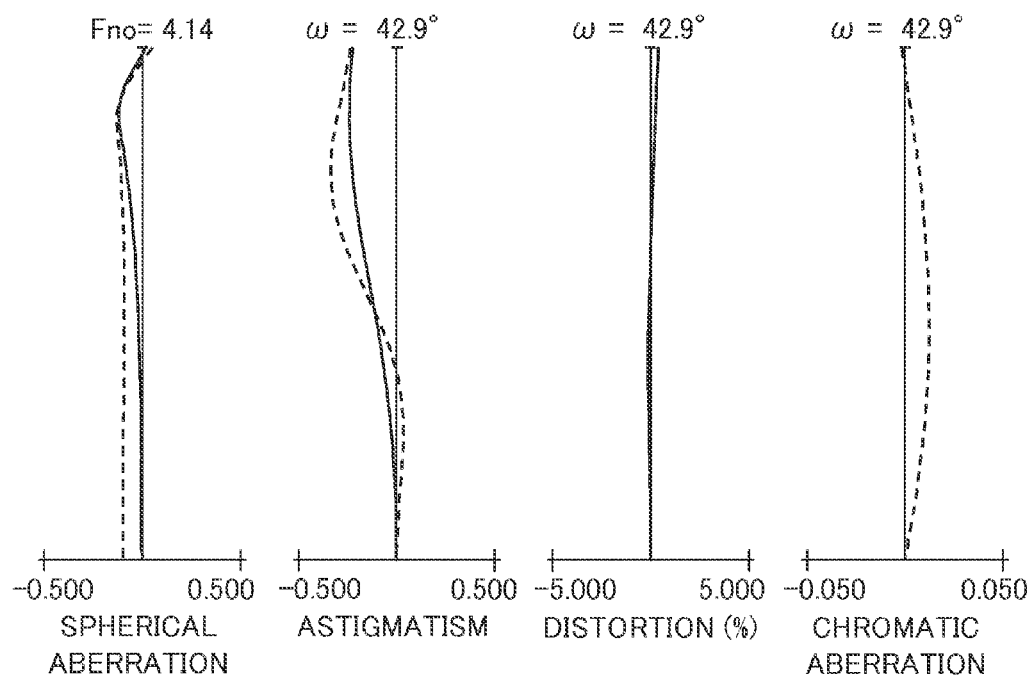
Figure 7:
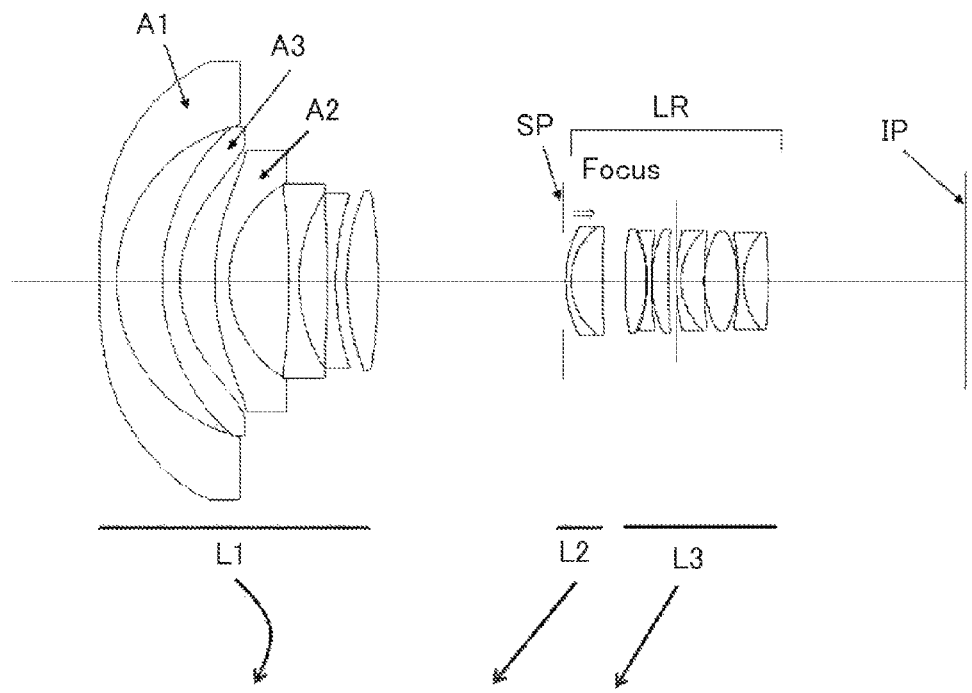
FIG. 7 is a sectional view of a zoom lens according to a fourth embodiment of the present invention.
Figure 8A:
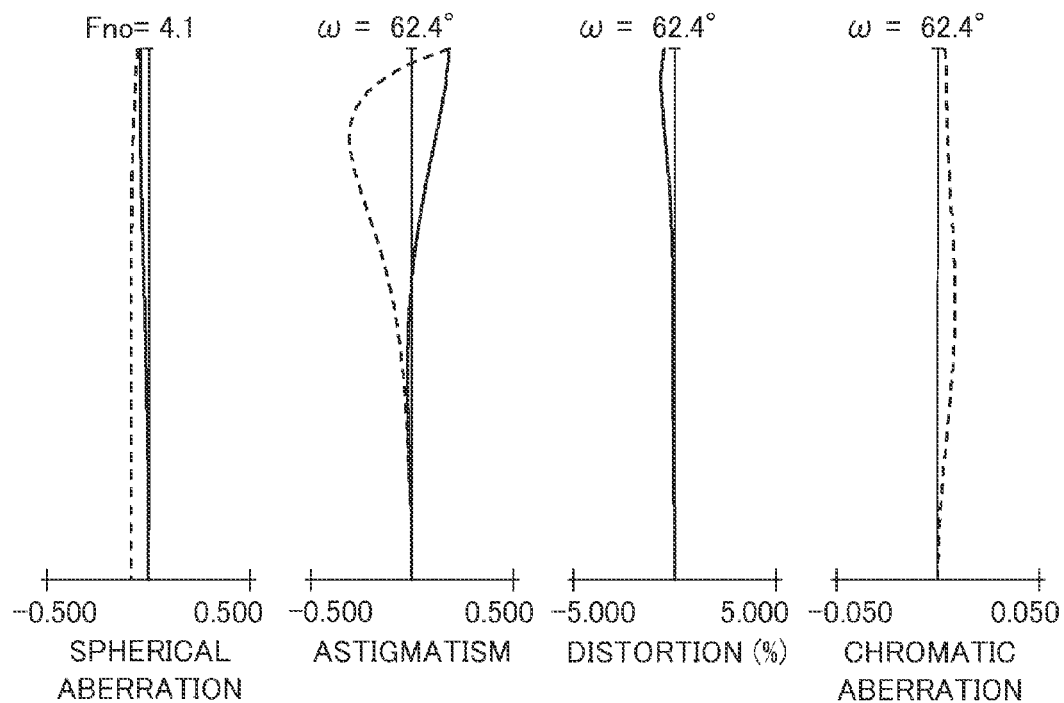
FIGS. 8A and 8B are aberrational diagrams at a wide angle end and a telephoto end in the zoom lens for an object at infinity according to the fourth embodiment of the present invention.
Figure 8B:
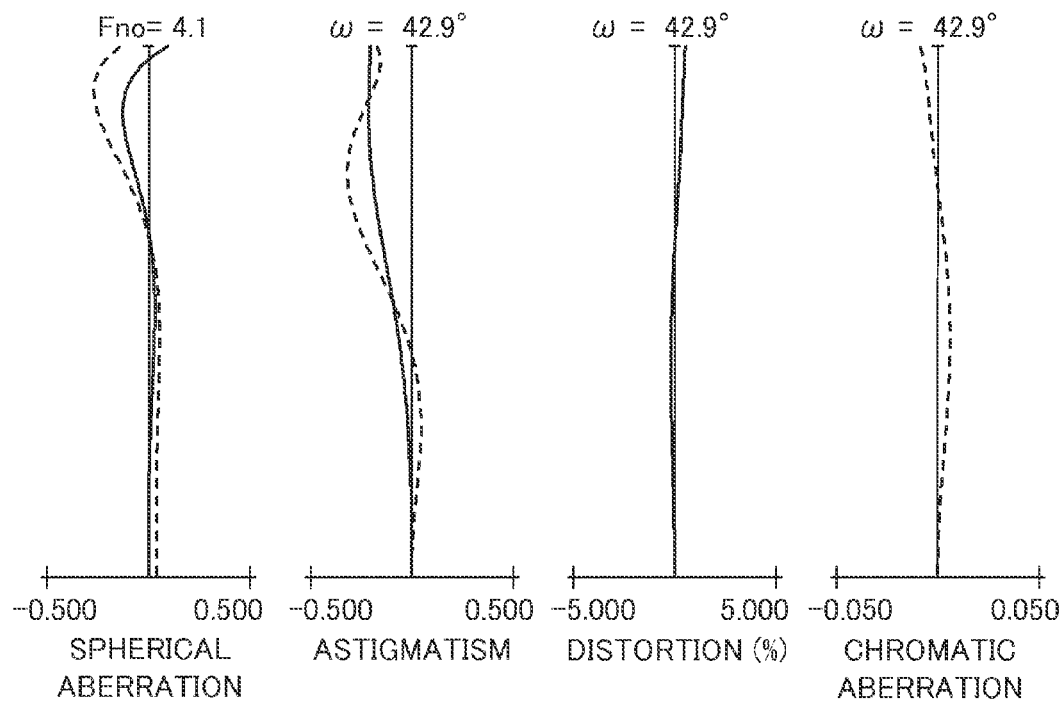
Figure 9:
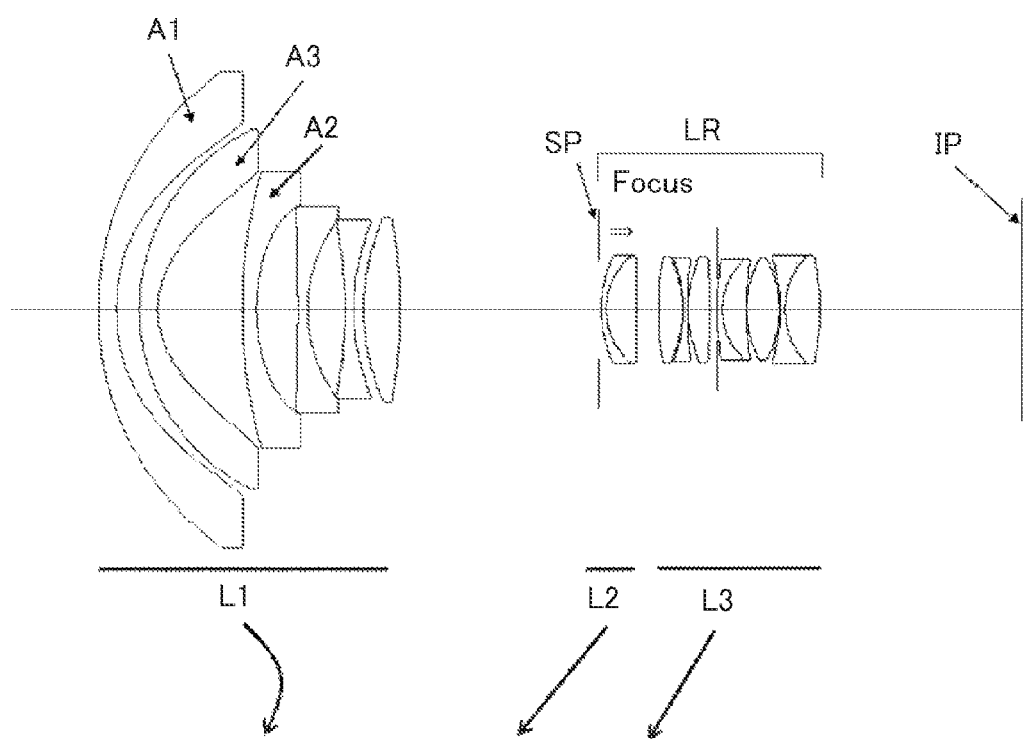
FIG. 9 is a sectional view of a zoom lens according to a fifth embodiment of the present invention.
Figure 10A:
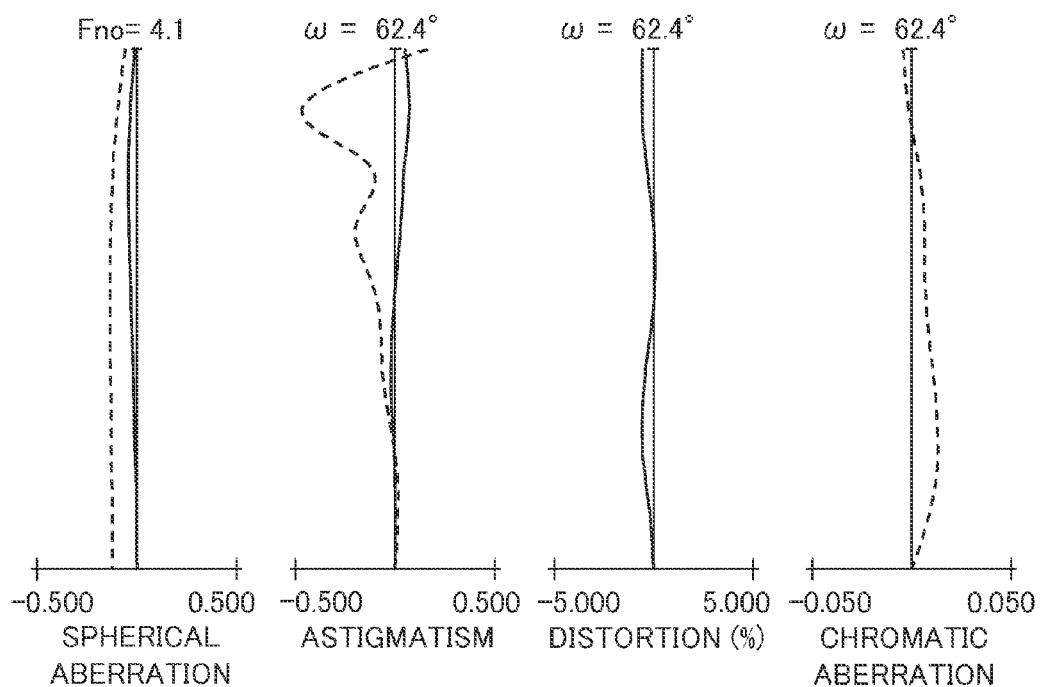
FIGS. 10A and 10B are aberrational diagrams at a wide angle end and a telephoto end in the zoom lens for an object at infinity according to the fifth embodiment of the present invention.
Figure 10B:
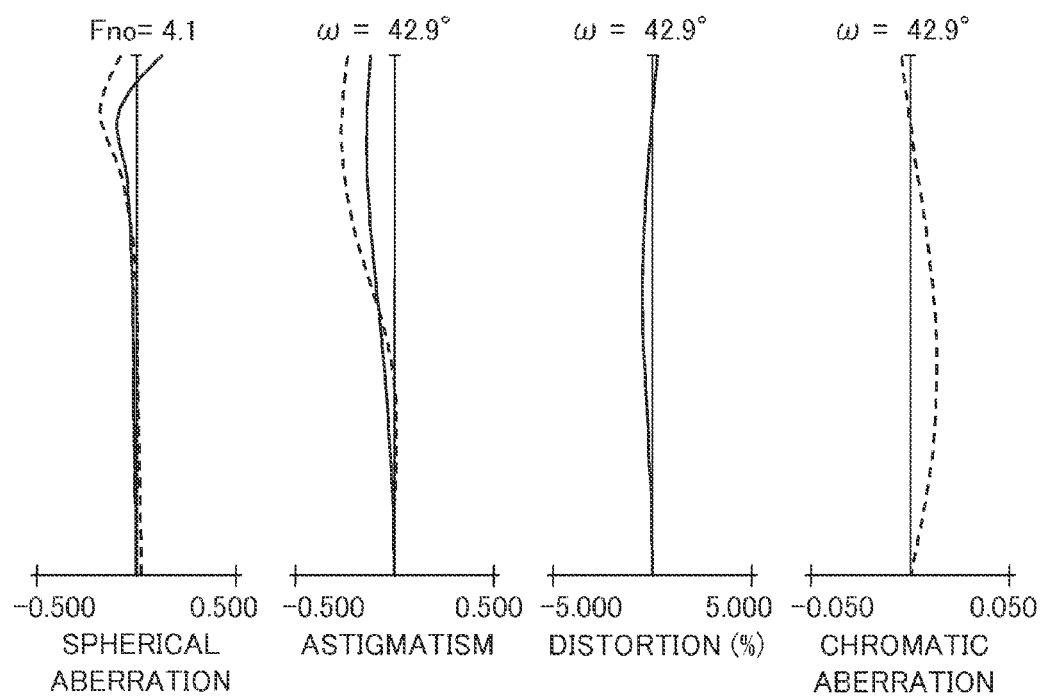
Figure 11:
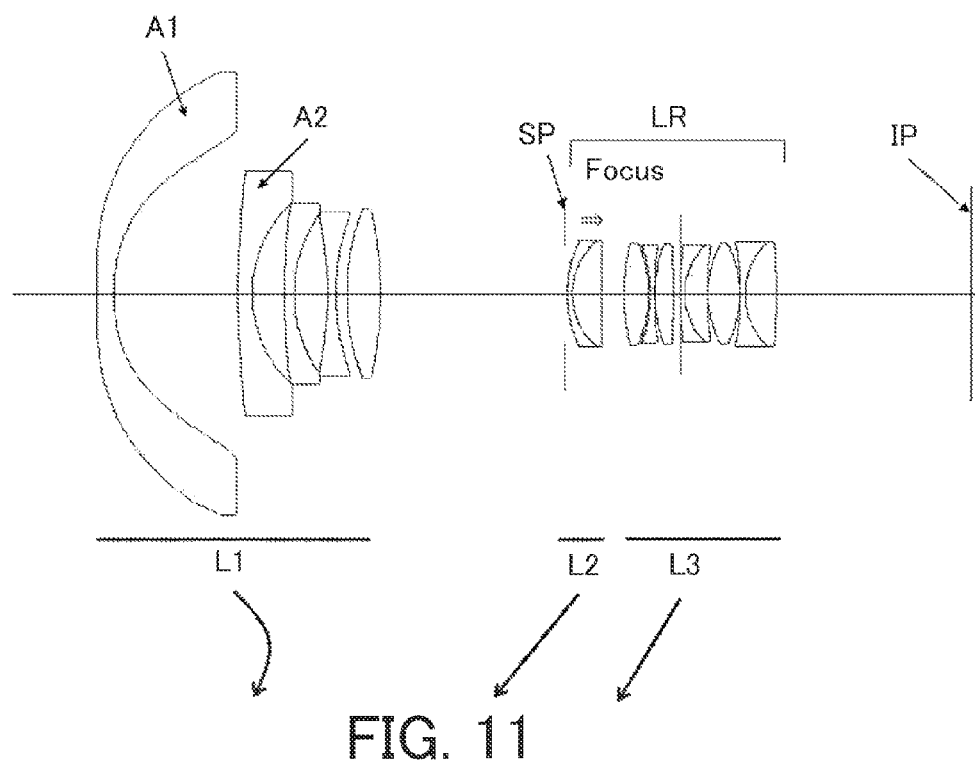
FIG. 11 is a sectional view of a zoom lens according to a sixth embodiment of the present invention.
Figure 12A:
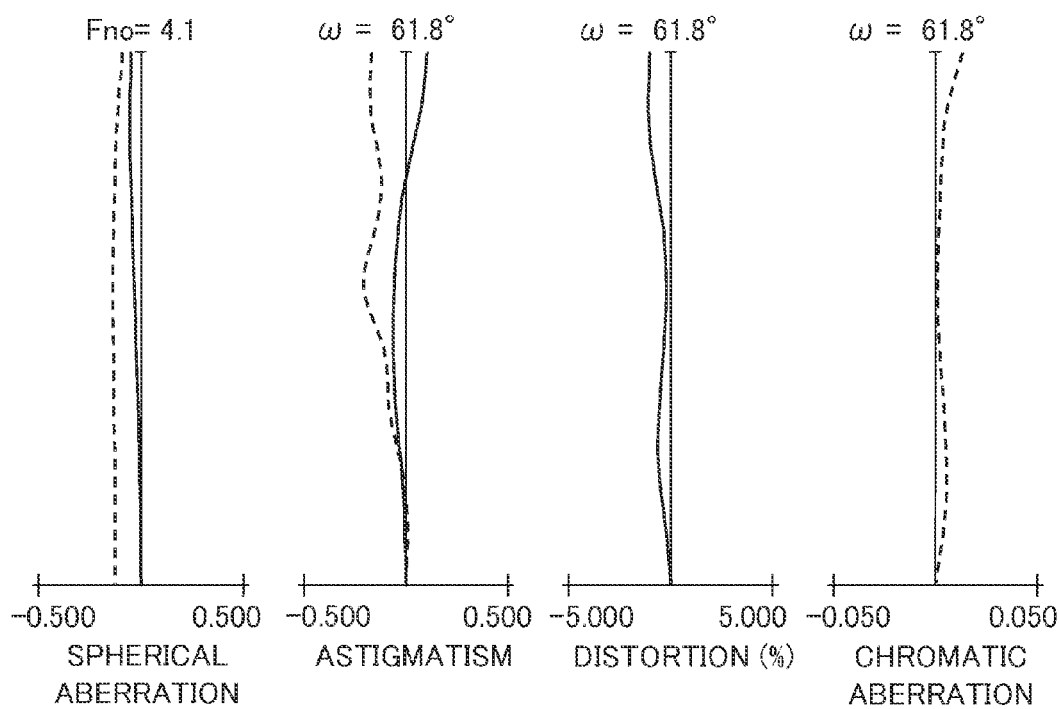
FIGS. 12A and 12B are aberrational diagrams at a wide angle end and a telephoto end in the zoom lens for an object at infinity according to the sixth embodiment of the present invention.
Figure 12B:
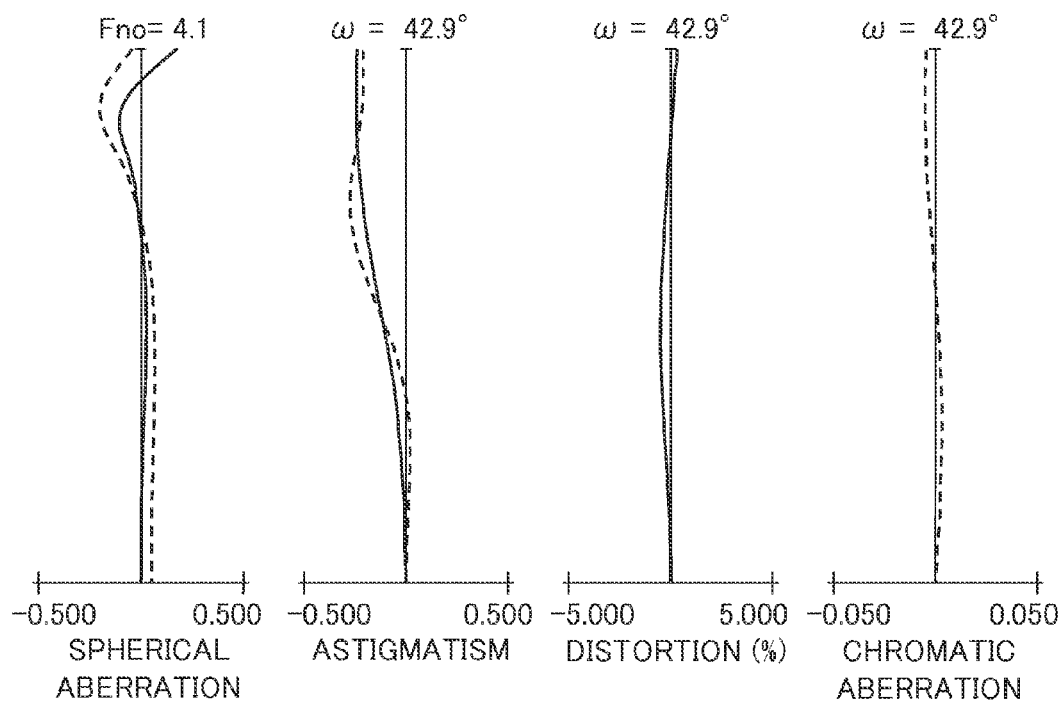
Figure 13:
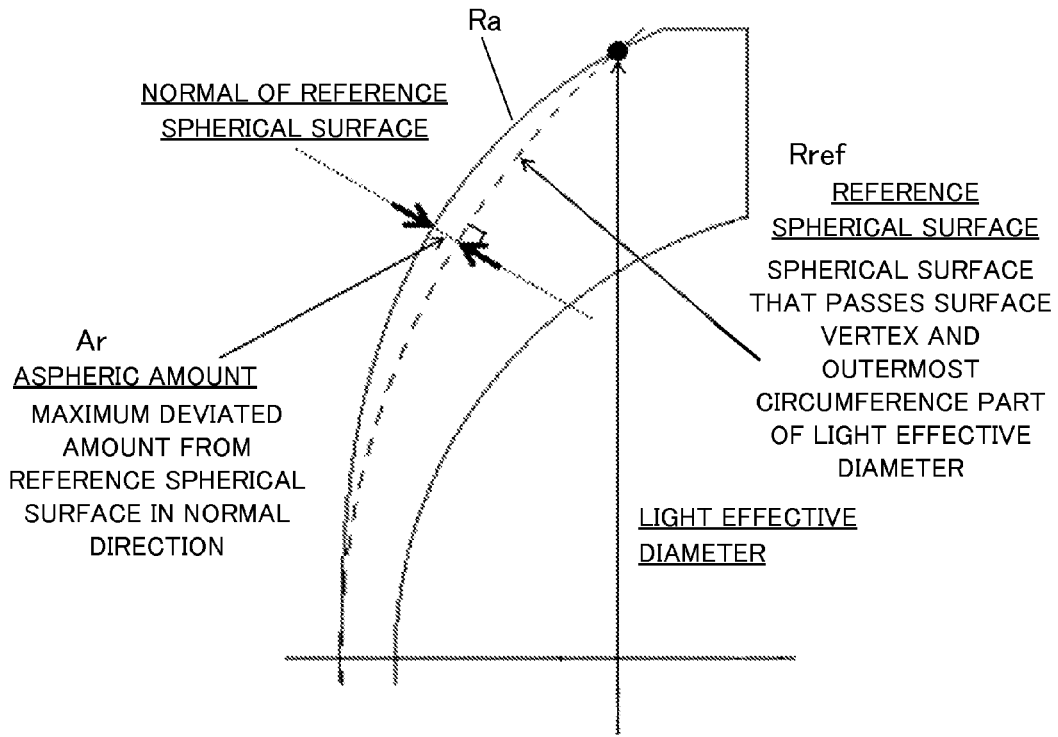
FIG. 13 is a view for explaining a definition of an aspheric amount.
Figure 14:
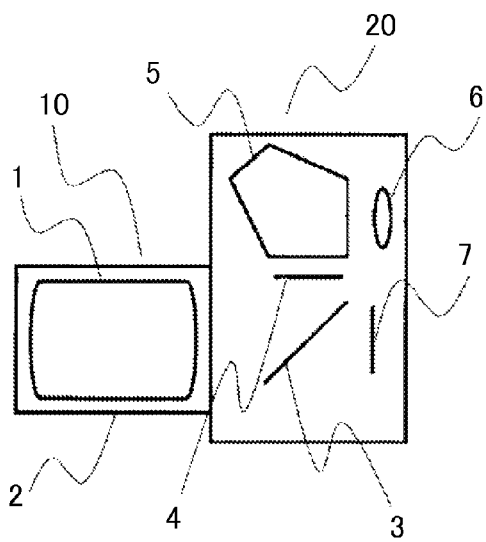
FIG. 14 is a view for explaining a principal part of an image-pickup apparatus.

FIG. 1 is a lens sectional view of a zoom lens at a wide angle end (short focal length end) according to a first embodiment of the present invention. FIGS. 2A and 2B are aberrational diagrams on a wide angle end and a telephoto end (long focal length edge) of the zoom lens according to the first embodiment, respectively. The first embodiment provides a zoom lens having a zoom ratio of 2.06 and a numerical aperture of 4.10. FIG. 3 is a lens sectional view of a zoom lens at a wide angle end according to a second embodiment of the present invention. FIGS. 4A and 4B are aberrational diagrams at a wide angle end and a telephoto end of the zoom lens according to the second embodiment. The second embodiment provides a zoom lens having a zoom ratio of 2.06 and a numerical aperture of 4.10. FIG. 5 is a lens sectional view of a zoom lens at a wide angle end according to a third embodiment of the present invention. FIGS. 6A and 6B are aberrational diagrams at a wide angle end and a telephoto end of the zoom lens according to the third embodiment. The third embodiment provides a zoom lens having a zoom ratio of 2.06 and a numerical aperture of about 4.16~4.14. FIG. 7 is a lens sectional view of a zoom lens at a wide angle end according to a fourth embodiment of the present invention. FIGS. 8A and 8B are aberrational diagrams at a wide angle end and a telephoto end of the zoom lens according to the fourth embodiment. The fourth embodiment provides a zoom lens having a zoom ratio of 2.06 and a numerical aperture of about 4.10. FIG. 9 is a lens sectional view of a zoom lens at a wide angle end according to a fifth embodiment of the present invention. FIGS. 10A and 10B are aberrational diagrams at a wide angle end and a telephoto end of the zoom lens according to the fifth embodiment. The fifth embodiment provides a zoom lens having a zoom ratio of 2.06 and a numerical aperture of about 4.10. FIG. 11 is a lens sectional view of a zoom lens at a wide angle end according to a sixth embodiment of the present invention. FIGS. 12A and 12B are aberrational diagrams at a wide angle end and a telephoto end of the zoom lens according to the sixth embodiment. The sixth embodiment provides a zoom lens having a zoom ratio of 2.01 and a numerical aperture of about 4.10. FIG. 13 is a view for explaining an aspheric amount. FIG. 14 is a schematic view of a principal part of a digital still camera (image-pickup apparatus) that includes a zoom lens according to the present invention. In the lens sectional view, a left side is an object side (front side), and a right side is an image side (backside).

In the lens sectional view, "i" denotes an order of each lens unit from the object side to the image side, and Li is an i-th lens unit. LR denotes a rear lens group that includes one or more lens units and has a positive refractive power as a whole. SP denotes an F-number (Fno) determiner that serves as an aperture stop (referred to as an "aperture diaphragm" hereafter) configured to determine (limit) an aperture F-number light flux. IP denotes an image plane, on which an image-pickup plane of a solid state image pickup element (photoelectric conversion element), such as a CCD sensor and a CMOS sensor, is placed when it is used for an image-pickup optical system for a video camera, a digital still camera, etc. or a photosensitive plane or film plane is placed when it is used for an image-pickup optical system for a film-based camera.

In a spherical aberrational diagram, a solid line illustrates a d-line (wavelength of 587.6 nm) and a dotted line illustrates the F-line (wavelength of 435.8 nm). In an astigmatism diagram, a dotted line illustrates a meridional image plane, and a solid line illustrates a sagittal image plane. A lateral chromatic aberration represents a difference of the F-line relative to the d-line. Fno denotes the F number. ω denotes half an image-pickup angle of view.

In the following embodiments, a wide angle end and a telephoto end are zoom positions when a magnification-varying lens is located at both mechanically available ends in the optical axis. In the lens sectional view, an arrow illustrates a movement locus of each lens unit in zooming from the wide angle end to the telephoto end.

In the lens sectional view of the first, fourth to six embodiments illustrated in FIGS. 1, 7, 9, and 11, L1 denotes a first lens unit having a negative power (optical power is a reciprocal of a focal length), L2 denotes a second lens unit of a positive refractive power, and L3 denotes a third lens unit having a positive refractive power. In the first, fourth to six embodiments, the rear lens group LR includes, in order from the object side to the image side, a second lens unit having a positive refractive power, and a third lens unit having a positive refractive power.

In zoom lenses of the first, fourth to sixth embodiments, the first lens unit L1 approximately reciprocates with a convex locus on the image side in zooming from the wide angle end to the telephoto end, and corrects image plane fluctuations associated with the magnification variation. The second lens unit L2 monotonously moves to the object side. The third lens unit L3 moves to the object side. Each lens unit moves so that an interval between the first lens unit L1 and the second lens unit L2 is smaller and an interval between the second lens unit L2 and the third lens unit L3 is larger at the telephoto end than those at the wide angle end. The second lens unit L2 is moved to the image side for focusing from an infinite object (infinite distance object) to a short distance object. The F-number determiner SP is located on the object side of the second lens unit L2, and moves together with the second lens unit L2 in zooming.

FIG. 3 is a lens sectional view according to the second embodiment. L1 denotes a first lens unit having a negative refractive power, and L2 denotes a second lens unit having a positive refractive power.

In the second embodiment, a rear lens group LR includes a second lens unit having a positive refractive power. In the zoom lens according to the second embodiment, the first lens unit L1 approximately reciprocates with a convex locus on the image side in zooming from a wide angle end to a telephoto end, and corrects image plane fluctuations associated with the magnification variation. The second lens unit L2 monotonously moves to the object side for main magnification variations. An interval between the first lens unit L1 and the second lens unit L2 is smaller at the telephoto end than that at the wide angle end.

A lens unit L2F, which is part of the second lens unit L2, is moved to the image side for focusing from the infinite object to the short distance object. The F-number determiner SP is located on the object side of the second lens unit L2, and moves together with the second lens unit L2 in zooming.

In the lens sectional view according to the third embodiment illustrated in FIG. 5, L1 denotes a first lens unit having a negative refractive power, L2 denotes a second lens unit having a positive refractive power, L3 denotes a third lens unit having a positive refractive power, and L4 denotes a fourth lens unit having a negative refractive power.

In the zoom lens according to the third embodiment, the first lens unit L1 approximately reciprocates with a convex locus on the image side in zooming from a wide angle end to a telephoto end, and corrects image plane fluctuations associated with the magnification variation. The second lens unit L2, the third lens unit L3, and the fourth lens unit L4 move to the object side. Each lens unit is moved so that an interval between the first lens unit L1 and the second lens unit L2 is smaller, an interval between the second lens unit L2 and the third lens unit L3 is smaller, and an interval between the third lens unit L3 and the fourth lens unit L4 is larger at the telephoto end than those at the wide angle end.

The second lens unit L2 is moved to the image side for focusing from the infinite object to the short distance object. The F-number determiner SP is located on the object side of the second lens unit L2, and moves together with the second lens unit L2 in zooming.

A rear lens group LR includes, in order from the object side to the image side, the second lens unit having the positive refractive power, the third positive lens unit having the positive refractive power, and the fourth lens unit having the negative refractive power in the third embodiment.

A description will now be given of a definition of an aspheric amount in the present invention. An aspheric amount Ar represents a maximum value of a deviation amount of an aspheric surface R from a reference spherical surface Rref, as illustrated in FIG. 13. A radius (curvature radius) of a reference spherical surface Rref is a radius of the spherical surface determined by a surface vertex and a ray effective diameter of the surface.

An aspheric amount is defined as positive when a deviating direction of the aspheric surface Ra from the reference spherical surface Rref is a medium mounting direction for the reference spherical surface Rref, and defined as negative when the deviating direction of the aspheric surface Ra from the reference spherical surface Rref is a medium cutting direction. For example, the aspheric surface Ra illustrated in FIG. 13 has a positive aspheric surface. In an aspheric lens in which both lens surfaces are aspheric, an aspheric amount of the aspheric lens is a sum of the aspheric amount of each lens surface. According to the present invention, the aspheric surface having a positive aspheric amount satisfies the following conditional expression (xa), and the aspheric lens having a negative aspheric amount satisfies the following conditional expression (xb):

$$0.010 < (Ar1/Ea1 + Ar2/Ea2) \times Nd \quad \text{(xa)}$$

$$-0.002 > (Ar1/Ea1 + Ar2/Ea2) \times Nd \quad \text{(xb)}$$

Herein, Ar1 denotes an aspheric amount of a lens surface on the object side, and Ar2 denotes an aspheric amount of a lens surface on the image side. An aspheric amount Asp of the aspheric lens is expressed by Ar1 and Ar2. Ea1 denotes a ray effective diameter on the lens surface on the object side, and Ea2 denotes a ray effective diameter on the lens surface on the image side. Nd is a refractive index of the material of the aspheric lens.

An aspheric effect of an aspheric lens that does not satisfies the conditional expression (xa) or (xb) is too small for the effect of the present invention, and that aspheric lens is not contained in the present invention.

Next follows a method of determining a sign of an aspheric amount based upon lens data in the well-known document and actual lenses and a method for concretely calculating an aspheric amount. In order to determine a sign of the aspheric amount and to calculate the aspheric amount, it is necessary to initially calculate a radius (of curvature) of a reference aspheric surface and for that purpose, it is necessary to obtain a ray effective diameter.

The lens data in the document may not contain the effective diameter. In that case, the easiest method of obtaining a ray effective diameter is to calculate a drawing magnification based upon an actual size of a lens overall length on an image of the lens sectional view and a known lens overall length indicated in numerical data, and to multiply the actual size of the diameter of the curved surface part on the image by the drawing magnification. The diameter of the curved surface part of the lens image is set slightly larger than the actual ray effective diameter, but this method is sufficient to roughly find the aspheric amount or to determine the sign of the aspheric amount.

A method of more precisely calculating a ray effective diameter can use a marginal contact part in the first lens unit having the negative refractive power or a biconvex lens. It becomes easier to miniaturize the overall system and to correct a curvature of field by reducing the intervals among a series of negative lenses in the first lens unit having the negative refractive power in the wide angle-of-view image-pickup lens. Therefore, most wide angle-of-view image-pickup lenses have a marginal contact lens pair in which lens peripheries of the negative lenses contact each other.

Usually, it also becomes easier to miniaturize the overall system and to correct a curvature of field in the periphery of the biconvex lens by making the lens peripheral thickness as thin as possible. Ray tracing is provided for all lens surfaces of the first lens unit by setting the intersection between lens surfaces to a provisional effective diameter. As a result, an outermost light flux is determined at one point corresponding one of the provisional effective diameters and the height of the ray on each lens surface is a ray effective diameter.

A description will now be given of a method of calculating a ray effective diameter based upon the actual lens. The easiest method of obtaining the ray effective diameter is to measure a diameter of a polished surface part of each lens. In most lenses, an allowance amount of the polished surface to the outermost diameter is made as small as possible relative to the effective diameter so as to reduce the body weight. Therefore, when polished surface diameter is measured, a more precise ray effective diameter can be obtained, which is sufficient to determine a sign of the aspheric amount and to know a rough aspheric amount.

A method of obtaining a more precise ray effective diameter is to measure an internal diameter of a light shield that is highly likely to exist in most cases in the first lens unit having a negative refractive power.

Usually, when intense light hits an edge part of the boundary between the polished surface and the rough rubbing surface, the light is diffusedly reflected and the ghost light is generated. Therefore, a light shield suitable for the ray effective diameter is arranged at the boundary between the polished surface and the rough rubbing surface so as to cut the unnecessary light. The ray tracing is provided by setting the diameter of the light shield to the provisional effective diameter.

As a result, an outermost light flux is determined which corresponds to one of the provisional effective diameters, and the height of the ray on each lens surface is a ray effective diameter. A description will be given of a method of obtaining a precise ray effective diameter from another aspect.

It is a method of gradually inserting the light shield from the lens outer circumferential part to the center in the forefront surface of the lens system by combining the lens system with an image-pickup apparatus or a projection apparatus.

The position of the light shield just before the captured or projected image starts containing a shade corresponds to a ray effective diameter on the forefront surface of the lens system. The ray effective diameter other than the forefront surface of the first lens unit can be found.

A description will be given of how the present invention obtains a wide angle-of-view zoom lens having a small distortion and a high performance. JP 2005-106878 discloses a wide angle-of-view, four-unit zoom lens that includes first to fourth lens units having negative, positive, positive, and negative refractive powers. When the first lens unit having the negative refractive power includes two aspheric lenses, a small overall system, a wide angle of view, and low distortion can be obtained but there are a large amount of astigmatism and a large amount of coma.

Usually, the wide angle-of-view lens needs to make strong the power of the first lens unit having the negative refractive power for a small configuration and wide angle of view, and consequently causes a large amount of barrel shaped distortion. Therefore, in many cases, an aspheric lens having a positive aspheric amount axis is arranged as the first lens unit in which an incident height ha of the off-axis principal ray is high, so as to correct the barrel shaped distortion and to widen an angle of view.

JP 2005-106878 arranges two aspheric lenses each having a positive aspheric amount as the first lens unit having the negative refractive power and effectively corrects the distortion. However, the positive aspheric effect increases the astigmatism around the image and the peripheral performance is insufficient.

JP 2008-046208 discloses a wide angle-of-view, four-unit zoom lens that includes first to fourth lens units having negative, positive, negative, and positive refractive powers. This zoom lens uses two aspheric lenses for the first lens unit having the negative refractive power and realizes a small overall system, a wide angle of view, and a high performance, but a distortion correction is insufficient. JP 2008-046208 arranges an aspheric lens having a positive aspheric amount as the lens that has a high incident height ha of an off-axis principal ray and is closest to the object, and corrects the astigmatism caused by this lens by arranging an aspheric lens having a negative aspheric amount as the second lens from the object side.

However, an effect of the aspheric lens having the positive aspheric amount and an effect of the aspheric lens having the negative aspheric amount cancel each other, and the distortion correcting effect is not always sufficient. A very large radius of the reference spherical surface of the lens surface on the object side intensifies the divergent refractive power in the paraxial component intensifies, causing a large amount of barrel shaped distortion. It is difficult to sufficiently correct the distortion even utilizing the positive aspheric component.

JP 2008-233284 discloses a wide angle-of-view, two-unit zoom lens that includes first and second lens units having negative and positive refractive powers. The zoom lens uses two aspheric lenses for the first lens unit having the negative refractive power, realizes a wide angle of view and a high performance, but its size is large and the distortion correcting effect is insufficient.

JP 2008-233284 arranges an aspheric lens having a positive aspheric amount as the second lens from the object side which has a relatively high incident height ha of an off-axis principal ray and corrects the distortion. It corrects the astigmatism caused by the aspheric lens by arranging an aspheric lens having a negative aspheric amount as the third lens from the object side. Since an effect of the lens having the positive aspheric amount and an effect of the lens having the negative aspheric amount cancel each other, the distortion correcting effect is not always sufficient and the overall system size is likely to become larger.

US2011/0109974 discloses a fixed focal length, wide angle-of-view lens that uses an aspheric surface having a very large slope angle in the lens periphery for the second lens, and obtains a strong positive aspheric amount, a wide angle of view, and a low distortion.

In an attempt to provide zooming with this wide angle-of-view lens system, when the incident height ha of the off-axis principal ray that passes the first lens unit changes, an aspheric amount greatly changes at each ray position. Thereby, a relationship between the distortion and the astigmatism drastically changes. It is thus difficult to apply it to the wide angle-of-view zoom lens.

According, to the present invention an aspheric lens is used having the positive aspheric amount for a lens closest to the object side and having the highest incident height ha of the off-axis principal ray in the entire system, and obtains a sufficient distortion correcting effect. The aspheric lens having the negative aspheric amount is arranged at a position where the incident height ha of the off-axis principal ray becomes lower but there is still an off-axis aberration correcting effect so as to reduce the astigmatism caused by the aspheric lens having the positive aspheric amount. Thereby, the astigmatism can be properly corrected without cancelling the distortion correcting effect in the aspheric lens closest to the object.

The barrel shaped distortion becomes weaker in zooming from the wide angle end to the telephoto end by arranging the aspheric lens. At the same time, the incident height ha of the off-axis principal ray in the first lens unit becomes lower, the distortion correcting effect reduces in the aspheric lens having the positive aspheric amount, and the astigmatism generated by the aspheric lens reduces. Moreover, the incident height ha of the off-axis principal ray in the aspheric lens having the negative aspheric amount also becomes lower, and the astigmatism correcting effect also reduces. Due to this relationship, the distortion and the astigmatism can be corrected in a well-balanced manner.

The off-axis ray can travel in the normal direction and the barrel shaped distortion in the paraxial component can be restrained by reducing a radius of curvature (of a reference aspheric surface) of the lens surface on the object side of the aspheric lens closest to the object or, in other words, furthest from the image plane. Since the distance in the optical axis direction increases from the lens surface vertex to the lens surface periphery, it is likely to secure a positive aspheric amount.

The zoom lens according to the present invention includes a first lens unit having a negative refractive power, and a rear lens group LR having a positive refractive power as a whole and including one or more lens unit. An interval between the first lens and the rear lens group LR at the telephoto end is smaller than that at the wide angle end. The positive lead type zoom lens is advantageous to a high zoom ratio. However, the lens unit closest to the object has a positive refractive power, converging the off-axis light flux, and is not suitable for a zoom lens in which an image-pickup angle of view is larger than 100° at a wide angle end.

In the zoom lens according to the present invention, R1 denotes a radius of curvature of a lens surface closest to the object (which is a radius of curvature when it is a sphere, and a radius of curvature of a reference spherical surface when it is aspheric). D12 denotes an interval on an optical axis from a lens surface vertex of the first aspheric lens to a lens surface vertex of the second aspheric lens, and BLD1 denotes a lens unit length of the first lens unit. At this time, the following conditional expressions are satisfied:

$$0.50 < R1/BLD1 < 2.50 \quad (1)$$

$$0.30 < D12/BLD1 < 0.80 \quad (2),$$

In the zoom lens according to the present invention, the lens closest to the object in the first lens unit has the positive aspheric amount, and includes the first aspheric lens that satisfies the conditional expression (1), and the second aspheric lens having the negative aspheric amount on the image side of the first aspheric lens. Their positional relationship satisfies the conditional expression (2). A positive aspheric amount is provided to the lens closest to the objet in which an incident height ha of the off-axis principal ray is highest in the entire system, and thereby the barrel shaped distortion is effectively corrected. In addition, when the lens surface on the object side of the lens closest to the object satisfies the conditional expression (1), the distortion can be properly corrected.

The conditional expression (1) is a conditional expression used to restrain the barrel shaped distortion in the lens surface on the object side of the lens closest to the object by directing the off-axis ray as close to the normal direction as possible. When the radius of curvature exceeds an upper limit of the conditional expression (1), the curvature on the lens surface on the object side of the lens closest to the object becomes too weak, the divergent refractive power becomes too strong, and a large amount of barrel shaped distortion occurs. As a result, it is difficult to correct the distortion on the aspheric lens having the positive aspheric amount. When the radius of curvature becomes lower than the conditional expression (1), the curvature on the lens surface on the object side of the lens closest to the object becomes too strong and the lens shaping becomes difficult.

Next, the distortion and the astigmatism are corrected in a well-balanced manner since the zoom lens of each embodiment satisfies the conditional expression (2).

The conditional expression (2) is a conditional expression used to maintain an optical axis interval between the first aspheric lens having the positive aspheric amount and the second aspheric lens having the negative aspheric amount. When the value is higher than the upper limit of the conditional expression (2), the incident height ha of the off-axis principal ray on the second aspheric lens having the negative aspheric amount is too small and it becomes difficult to properly correct the astigmatism generated by the first aspheric lens having the positive aspheric amount.

When the value is lower than the lower limit of the conditional expression (2), the incident height ha of the off-axis principal ray on the second aspheric lens having the negative aspheric amount is too large and the distortion correcting effect of the first aspheric lens having the positive aspheric amount is cancelled out. The conditional expression may satisfy the following numerical ranges:

$$0.70 < R1/BLD1 < 1.80 \quad (1a)$$

$$0.35 < D12/BLD1 < 0.60 \quad (2a)$$

Thus, a zoom lens having a high optical performance in an entire zoom range can be obtained.

A description will be given of the condition to obtain a more advantageous effect in the present invention. A first aspheric lens A1 can be a negative lens having a meniscus shape with a convex surface facing the object side. The lens that satisfies the conditional expression (1) can be a lens having a positive power. The proper distortion correcting effect can be obtained when the positive lens is arranged to the lens closest to the object but the lens closest to the object converging the off-axis ray is inefficient in widening the angle of view, causing the overall system to be large.

When both lens surfaces of the first aspheric lens A1 are aspheric, a lens surface having a larger aspheric amount may be set to the lens surface on the object side rather than the lens surface on the image plane side. In the negative lens having a meniscus shape and a strong refractive power, the incident height ha of the off-axis principal ray is significantly different between the lens surface on the object side and the lens surface on the image side. Hence, the distortion correcting effect can be effectively obtained by arranging the lens surface having a larger aspheric amount to the lens surface on the object side which has a larger incident height ha.

Next, the second aspheric lens A2 may be a negative lens having a convex surface facing the image side (a lens having a negative refractive power). Thereby, the divergent power can be obtained in the paraxial component, and the astigmatism can be effectively corrected.

More specifically, assume that R2 is defined as a radius of curvature when the lens surface on the image side of the second aspheric lens A2 is spherical, and defined as a radius of a reference spherical surface when the lens surface on the image side of the second aspheric lens A2 is aspheric. Then, the following conditional expression may be satisfied:

$$0.30 < R2/BLD1 < 0.80 \quad (3)$$

When the value is higher than the upper limit of the conditional expression (3), the divergent power becomes weaker on the lens surface on the image side of the second aspheric lens A2, and the astigmatism correcting effect becomes smaller. When the value is smaller than the lower limit of the conditional expression (3), the divergent power on the lens surface on the image side of the second aspheric lens A2 becomes too strong and a large amount of distortion occurs. The numerical value range of the conditional expression (3) may be set as follows:

$$0.35 < R2/BLD1 < 0.65 \quad (3a)$$

A third aspheric lens A3 having a positive aspheric amount may be arranged between the first aspheric lens A1 and the second aspheric lens A2. This configuration can obtain a stronger distortion correcting amount, and facilitate a wide angle of view and low distortion.

The first lens unit L1 with the negative refractive power may include, in order from the object side to the image side, three consecutive meniscus lenses. The incident height ha of the off-axis principal ray is made greatly different between the lens surface on the object and the lens surface of the image side by arranging a wide angle-of-view lens that is a negative lens with a meniscus shape on the object side. Therefore, the distortion correcting effect is obtained on the convex surface on the object side which has a high incident height ha by obtaining the divergent power on the concave surface on the image side having a low incident height ha.

Moreover, the three consecutive negative meniscus lenses arranged in order from the position closest to the object to the image side disperse the divergent power of the first lens unit L1 among these lenses, widen the angle of view, and restrain the barrel shaped distortion.

In the zoom lens according to the present invention, assume that f1 denotes a focal length of the first lens unit, and fw denotes a focal length of the overall system at the wide angle end. Then, the following conditional expression may be satisfied:

$$1.00 < |f1|/fw < 2.50 \quad (4)$$

The conditional expression (4) is a conditional expression used to achieve a miniaturization of the entire system and to reduce the distortion by properly setting the negative (refractive) power of the first lens unit L1. When the value is higher than the upper limit of the conditional expression (4), the negative power of the first lens unit L1 becomes too weak and the entire system becomes larger.

When the value is smaller than the lower limit of the conditional expression (4), the negative power of the first lens unit L1 becomes too strong and a larger amount of barrel shape distortion occurs. The numerical range of the conditional expression (4) may be set as follows:

$$1.40 < -f1/fw < 1.90 \tag{4a}$$

As described above, the aspheric lens having the positive or negative aspheric amount according to the present invention satisfies at least one of (xa) and (xb) but further the condition of the aspheric lens may satisfy the next numerical range:

$$0.015 < (Asp1/Ea1 + Asp2/Ea2) \times Nd < 0.100 \tag{xaa}$$

$$-0.050 < (Asp1/Ea1 + Asp2/Ea2) \times Nd < -0.004 \tag{xbb}$$

When the value is higher than the upper limit of the conditional expression (xaa) or lower than the lower limit of the conditional expression (xbb), the aspheric amount becomes too large. As a result, when the incident height ha of the off-axis principal ray changes in zooming, the effect significantly varies and the high performance becomes difficult in the entire zooming area.

When the value is lower than the smaller limit of the conditional expression (xaa) or higher than the upper limit of the conditional expression (xbb), the aspheric effect becomes small as described above.

In the zoom lens according to the present invention, when a distance between adjacent lenses changes in zooming, these lenses belong to lens units different from each other, and when the distance between the adjacent lenses does not change in zooming, each lens belongs to the same lens unit.

The present invention is applicable to an image-pickup apparatus (or image projector or another optical apparatus) having the above optical system.

A description will be given of a lens configuration of each embodiment. The first embodiment provides a three-unit zoom lens that includes, in order from the object side to the image side, a first lens unit L1 having a negative refractive power, a second lens unit L2 having a positive refractive power, and a third lens unit L3 having a positive refractive power. The overall image-pickup angle of view at the wide angle end is 125°.

The first lens unit L1 includes, in order from the object side to the image side, three meniscus negative lenses each having a convex surface on the object side, a negative biconcave lens, and a positive biconvex lens. Thereby, the divergent power is divided among a plurality of negative lenses without drastically causing a large amount of barrel shaped distortion, and easily provides the wide angle of view. In particular, the three meniscus negative lenses on the object side obtain a strong divergent power on the lens surface on the image side in which the incident height ha of the off-axis principal ray is low, and the barrel shaped distortion is restrained on the lens on the object side in which the incident height ha is high.

The negative meniscus lens closest to the object is the aspheric lens A1 in which the lens surface on the object side has a positive aspheric amount, and corresponds to the first aspheric lens in the present invention. More specifically, the lens surface on the object side having a high incident height ha has a positive aspheric amount and effectively corrects the barrel shaped distortion. The lens surface on the object side of the aspheric lens A1 satisfies the conditional expression (1). Thereby, the off-axis passes the normal direction of the lens surface, and the distortion in the paraxial component is restrained.

The third negative meniscus lens from the object side is an aspheric lens A2 having a negative aspheric amount on the lens surface on the image side, and corresponds to the second aspheric lens in the present invention. More specifically, the lens surface on the image side has a negative aspheric amount and properly corrects the astigmatism. At the same time, the lens surface on the image side of the aspheric lens A2 has a concave surface facing the image side, and satisfies the conditional expression (3). Thereby, the angle of view is made wider and the astigmatism is effectively corrected.

An interval on the optical axis between the aspheric lens A1 and the aspheric lens A2 satisfies the conditional expression (2), and obtains the distortion correcting effect and the astigmatism correcting effect without cancelling them. This configuration obtains a high performance, wide angle-of-view zoom lens having a small amount of distortion. The second negative meniscus lens from the object side is an aspheric lens A3 in which the lens surface on the image side has a positive aspheric amount, and corresponds to the third aspheric lens in the present invention. Thereby, a distortion correcting effect can be stronger, the angle of view can be made wider, and the distortion can be well-corrected.

The power of the first lens unit L1 satisfies the conditional expression (4), and facilitates a small entire system and distortion correction. The three aspheric lenses A1, A2, and A3 satisfy the conditional expressions (xaa) and (xbb). Thereby, a distortion correcting effect at each lens can be sufficiently obtained, and a strong aberrational fluctuation is restrained in an aspheric component when the incident height ha changes in zooming.

The second embodiment provides a two-unit zoom lens that includes, in order from the object side to the image side, a first lens unit L1 having a negative refractive power, and a second lens unit L2 having a positive refractive power. The overall image-pickup angle of view is 125° at the wide angle end. The first lens unit L1 includes, in order from the object side to the image side, three meniscus negative lenses each having a convex surface on the object side, a negative biconcave lens, and a positive biconvex lens. The negative meniscus lens closest to the object is the aspheric lens A1 in which both lens surfaces have positive aspheric amounts, and corresponds to the first aspheric lens in the present invention.

The third negative meniscus lens from the object side is an aspheric lens A2 in which the lens surface on the image side has a negative aspheric amount, and corresponds to the second aspheric lens in the present invention. The second negative meniscus lens from the object side is an aspheric lens A3 in which the lens surface on the image side has a positive aspheric amount, and corresponds to the third aspheric lens in the present invention. The operation of each lens unit and aspheric lens are similar to those of the first embodiment.

The third embodiment provides a four-unit zoom lens that includes, in order from the object side to the image side, a first lens unit L1 having a negative refractive power, a second lens unit L2 having a positive refractive power, a third lens unit L3 having a positive refractive power, and a fourth lens unit L4 having a negative refractive power. The overall image-pickup angle of view is 125° at the wide angle end.

The first lens unit L1 includes, in order from the object side to the image side, three negative meniscus lenses each having a convex surface on the object side, a negative biconcave lens, and a positive biconvex lens. The negative meniscus lens closest to the object is the aspheric lens A1 in which the lens surface on the object side has a positive aspheric amount, and corresponds to the first aspheric lens in the present invention.

The third negative meniscus lens from the object side is the aspheric lens A2 in which the lens surface on the image side has a negative aspheric amount, and corresponds to the second aspheric lens in the present invention. The second negative meniscus lens from the object side is the aspheric lens A3 in which the lens surface on the image side has a positive aspheric amount, and corresponds to the third aspheric lens in the present invention. Operations of each lens unit and aspheric lenses are similar to those of the first embodiment.

The fourth embodiment provides a three-unit zoom lens that includes, in order from the object side to the image side, a first lens unit L1 having a negative refractive power, a second lens unit L2 having a positive refractive power, and a third lens unit L3 having a positive refractive power. The overall image-pickup angle of view is 125° at the wide angle end. The meniscus lens A1 closest to the object side is an aspheric lens in which a lens surface on the object side has a positive aspheric amount, and corresponds to the first aspheric lens in the present invention.

The third negative meniscus lens from the object side is an aspheric lens A2 in which the lens surface on the object side has a negative aspheric amount, and corresponds to the second aspheric lens in the present invention. The second negative meniscus lens element on the object side is the aspheric lens A3 in which the lens surface on the image side has a positive aspheric amount, and corresponds to the third aspheric lens in the present invention. Operations of each lens unit and aspheric lens are similar to those of the first embodiment.

The fifth embodiment provides a three-unit zoom lens that includes, in order from the object side to the image side, a first lens unit L1 having a negative refractive power, a second lens unit L2 having a positive refractive power, and a third lens unit L3 having a positive refractive power. The overall image-pickup angle of view is 125° at the wide angle end. The first lens unit L1 includes, in order from the object side to the image side, three meniscus negative lenses each having a convex lens on the object side, a negative biconcave lens, and a positive biconvex lens.

The negative meniscus lens closest to the object is the aspheric lens A1 in which the lens surface on the image side has a positive aspheric amount, and corresponds to the first aspheric lens in the present invention. In the first aspheric lens A1, the lens surface on the object side may be aspheric in which an incident height ha of the off-axis principal ray is high, but the positive aspheric amount on the image side as in the fifth embodiment can sufficiently provide the effect of the present invention although the size becomes slightly larger.

The third negative meniscus lens from the object side is an aspheric lens A2 in which the lens surface on the image side has a negative aspheric amount, and corresponds to the second aspheric lens. The second negative meniscus lens from the object side is an aspheric lens A3 in which the lens surface on the image side has a positive aspheric amount, and corresponds to the third aspheric lens. Operations of each lens unit and aspheric lens are similar to those of the first embodiment.

The sixth embodiment provides a three-unit zoom lens that includes, in order from the object side to the image side, a first lens unit L1 having a negative refractive power, a second lens unit L2 having a positive refractive power, and a third lens unit L3 having a positive refractive power. The overall image-pickup angle of view is 123° at the wide angle end. The first lens unit L1 includes, in order from the object side to the image side, two negative meniscus lenses each having a concave surface on the object side, a negative lens with a concave surface on the image side, a negative biconcave lens, and a positive biconvex lens. The negative meniscus lens closest to the object is an aspheric lens A1 in which both lens surfaces have positive aspheric amounts, and corresponds to the first aspheric lens in the present invention.

The second negative meniscus lens from the object side is an aspheric lens A2 in which the lens surface on the image side has a negative aspheric amount, and corresponds to the second aspheric lens in the present invention.

In the sixth embodiment, there is no third aspheric lens between the first aspheric lens A1 and the second aspheric lens A2 and only two meniscus lenses are consecutively provided from the object side. This embodiment is slightly inferior to other embodiments in compromising the distortion correction with the high performance but sufficiently maintains the effect of the present invention. Operations of each lens unit and aspheric lens are similar to those of the first embodiment except there is no third lens unit.

Next follows numerical examples according to each embodiment of the present invention. In each numerical example, i denotes an order of a surface from the object, ri denotes a radius of curvature on a lens surface, di denotes a lens thickness and an air interval between an i-th surface and an (i+1)-th surface, and ndi and vdi are a refractive index and an Abbe number of the d-line. BF denotes a back focus, represented by a distance from a final lens surface to an image plane. The lens overall length is a distance from the first lens surface to the image plane. An aspheric shape is expressed by the following expression where the optical axis direction is set to an X axis, a direction perpendicular to the optical axis is set to an H axis, a light traveling direction is set to positive, R is a paraxial radius of curvature, K is a conic constant, and A4, A6, A8, A10, A12, and A14 are aspheric constants:

$$x = \frac{(1/R)H^2}{1+\sqrt{1-(1+K)(H/R)^2}} + A4 \times H^4 + A6 \times H^6 + A8 \times H^8 + A10 \times H^{10} + A12 \times H^{12} + A14 \times H^{14}$$

[e+X] denotes [×10+x] and [e−X] denotes [×10−x]. An aspheric surface indicates an addition of * after the surface number. A section in which an interval d on each optical surface is (variable) means a variable interval in zooming, and a surface interval according to a focal length is indicated in a separate table. A section in which an effective diameter of each optical surface is (variable) means a variable effective diameter of each optical surface in zooming. A variable surface number is expressed as "eai" in the separate table, representing an effective diameter according to the focal length. Table 1 indicates a relationship among each parameter, each conditional expression, and a numerical expression.

| (numerical example 1) unit mm | | | | | |
|---|---|---|---|---|---|
| surface data | | | | | |
| surface number | r | d | nd | vd | effective diameter |
| 1* | 115.945 | 3.50 | 1.77250 | 49.6 | 84.00 |
| 2 | 32.057 | 6.64 | | | 60.74 |
| 3 | 37.090 | 3.50 | 1.58313 | 59.4 | 60.11 |
| 4* | 22.220 | 11.12 | | | 51.44 |

(numerical example 1)
unit mm

| | | | | | |
|---|---|---|---|---|---|
| 5 | 84.608 | 2.80 | 1.85400 | 40.4 | 50.36 |
| 6* | 34.842 | 9.29 | | | 37.87 |
| 7 | −140.769 | 2.00 | 1.59522 | 67.7 | 37.63 |
| 8 | 31.935 | 5.29 | | | 33.27 |
| 9 | −334.424 | 1.70 | 1.59522 | 67.7 | 33.24 |
| 10 | 53.829 | 2.33 | | | 32.88 |
| 11 | 47.178 | 6.44 | 1.83400 | 37.2 | 33.64 |
| 12 | −103.326 | (variable) | | | 33.23 |
| 13 (diaphragm) | ∞ | 0.50 | | | 19.16 |
| 14 | 23.766 | 1.00 | 1.91082 | 35.3 | 19.95 |
| 15 | 13.687 | 5.72 | 1.63980 | 34.5 | 19.17 |
| 16 | 231.365 | (variable) | | | 19.10 |
| 17 | 68.274 | 4.52 | 1.54814 | 45.8 | 19.12 |
| 18 | −25.113 | 0.15 | | | 18.93 |
| 19 | −28.520 | 0.90 | 1.91082 | 35.3 | 18.63 |
| 20 | 60.759 | 0.15 | | | 18.68 |
| 21 | 24.868 | 3.66 | 1.59551 | 39.2 | 19.10 |
| 22 | 179.295 | 1.50 | | | 18.87 |
| 23 | ∞ | 0.00 | | | (variable) |
| 24 | 43.910 | 0.90 | 1.83481 | 42.7 | 18.58 |
| 25 | 13.206 | 4.82 | 1.49700 | 81.5 | 17.70 |
| 26 | 69.017 | 0.15 | | | 17.84 |
| 27 | 20.913 | 5.95 | 1.49700 | 81.5 | 18.23 |
| 28 | −22.463 | 0.15 | | | 17.89 |
| 29 | −43.477 | 0.90 | 1.77250 | 49.6 | 17.08 |
| 30 | 14.975 | 6.06 | 1.58313 | 59.4 | 17.67 |
| 31* | −75.778 | | | | 18.81 |

Aspheric data

First surface

K = 0.00000e+000  A4 = 6.63370e−006  A6 = −6.87415e−009
A8 = 6.26701e−012  A10 = −3.06214e−015  A12 = 6.75822e−019

Fourth surface

K = −6.27707e−001  A4 = 8.37327e−006  A6 = −2.71817e−008
A8 = 4.31896e−011  A10 = −9.33146e−014  A12 = 6.05602e−017

Sixth surface

K = −3.34645e+000  A4 = 1.77375e−005  A6 = −1.69043e−009
A8 = 1.35977e−010  A10 = −5.36943e−013  A12 = 1.00929e−015
A14 = −7.14368e−020

Thirty-first surface

K = −3.63687e+000  A4 = 2.15160e−005  A6 = 3.32343e−008
A8 = 4.69301e−011  A10 = 8.60198e−014

Various data
Zoom ratio 2.06

| | Wide angle | intermediate | telephoto |
|---|---|---|---|
| Focal length | 11.30 | 18.00 | 23.30 |
| Fno | 4.10 | 4.10 | 4.10 |
| Half angle Of view (°) | 62.42 | 50.24 | 42.88 |
| Image Height | 21.64 | 21.64 | 21.64 |
| Lens overall length | 172.19 | 161.28 | 162.86 |
| BF | 38.82 | 52.31 | 63.15 |
| d12 | 36.75 | 11.35 | 1.50 |
| d16 | 4.49 | 5.49 | 6.08 |
| ea23 | 12.09 | 15.59 | 19.16 | zoom lens unit data

| unit | starting surface | focal length | lens unit length | front principal point position | back principal point position |
|---|---|---|---|---|---|
| 1 | 1 | −19.53 | 54.60 | 10.16 | −41.88 |
| 2 | 13 | 61.01 | 7.72 | −0.31 | −5.25 |
| 3 | 17 | 76.40 | 29.81 | 10.08 | −10.88 |

(numerical example 2)
unit mm surface data

| surface number | r | d | nd | vd | effective diameter |
|---|---|---|---|---|---|
| 1* | 116.802 | 3.50 | 1.77250 | 49.6 | 84.00 |
| 2* | 36.803 | 11.86 | | | 65.04 |
| 3 | 49.848 | 3.50 | 1.49710 | 81.6 | 63.80 |
| 4* | 19.671 | 10.84 | | | 47.70 |
| 5 | 139.022 | 2.80 | 1.85400 | 40.4 | 45.97 |
| 6* | 39.650 | 8.12 | | | 34.54 |
| 7 | −80.871 | 2.00 | 1.59522 | 67.7 | 34.33 |
| 8 | 38.455 | 4.01 | | | 31.39 |
| 9 | −266.681 | 1.70 | 1.59522 | 67.7 | 31.36 |
| 10 | 50.285 | 1.73 | | | 31.37 |
| 11 | 45.349 | 6.40 | 1.88300 | 40.8 | 32.35 |
| 12 | −91.148 | (variable) | | | 32.07 |
| 13 (diaphragm) | ∞ | 0.50 | | | 19.30 |
| 14 | 23.627 | 1.00 | 1.91082 | 35.3 | 19.97 |
| 15 | 13.527 | 5.84 | 1.63980 | 34.5 | 19.18 |
| 16 | 309.605 | 4.10 | | | 19.14 |
| 17 | 70.421 | 4.54 | 1.54814 | 45.8 | 19.15 |
| 18 | −24.805 | 0.23 | | | 18.97 |
| 19 | −26.417 | 0.90 | 1.91082 | 35.3 | 18.69 |
| 20 | 74.786 | 0.15 | | | 18.84 |
| 21 | 26.165 | 4.13 | 1.59551 | 39.2 | 19.30 |
| 22 | −157.269 | 1.50 | | | 19.10 |
| 23 | ∞ | 0.00 | | | (variable) |
| 24 | 66.212 | 0.90 | 1.83481 | 42.7 | 18.52 |
| 25 | 13.147 | 4.71 | 1.49700 | 81.5 | 17.59 |
| 26 | 59.817 | 0.15 | | | 17.75 |
| 27 | 21.451 | 6.01 | 1.49700 | 81.5 | 18.16 |
| 28 | −21.035 | 0.15 | | | 17.98 |
| 29 | −37.854 | 0.90 | 1.77250 | 49.6 | 17.40 |
| 30 | 14.807 | 6.31 | 1.58313 | 59.4 | 17.77 |
| 31* | −52.985 | | | | 18.71 |

Aspheric data

First surface

K = 0.00000e+000  A4 = 8.21883e−006  A6 = −7.76339e−009
A8 = 7.51576e−012  A10 = −3.97942e−015  A12 = 8.79062e−019

Second surface

K = 0.00000e+000  A4 = 4.60093e−006  A6 = −2.60654e−009
A8 = 9.70241e−012  A10 = −3.87006e−015  A12 = −3.89386e−018

Fourth surface

K = −8.13124e−001  A4 = 1.29020e−005  A6 = −6.01423e−008
A8 = 5.35167e−011  A10 = −6.62488e−014  A12 = 6.40965e−017

Sixth surface

K = −3.68713e+000  A4 = 1.69004e−005  A6 = 1.26942e−008
A8 = 2.24261e−010  A10 = −1.06228e−012  A12 = 2.28380e−015
A14 = −7.14368e−020

Thirty-first surface

K = 1.32754e+000  A4 = 1.91236e−005  A6 = −2.19431e−009
A8 = 2.90687e−010  A10 = −1.44843e−012

Various data
Zoom ratio 2.06

| | Wide angle | intermediate | telephoto |
|---|---|---|---|
| Focal length | 11.30 | 18.00 | 23.30 |
| Fno | 4.10 | 4.10 | 4.10 |
| Half angle Of view (°) | 62.42 | 50.24 | 42.88 |
| Image height | 21.64 | 21.64 | 21.64 |
| lens overall length | 172.93 | 162.68 | 164.47 |
| BF | 38.82 | 52.87 | 63.99 |
| d12 | 35.63 | 11.32 | 2.00 |
| ea23 | 11.94 | 15.51 | 18.68 |

-continued (numerical example 2)
unit mm zoom lens unit data

| unit | starting surface | focal length | lens unit length | front principal point position | back principal point position |
|---|---|---|---|---|---|
| 1 | 1 | −18.76 | 56.47 | 12.73 | −40.06 |
| 2 | 13 | 39.34 | 42.52 | 10.69 | −24.21 |

(numerical example 3)
unit mm surface data

| surface number | r | d | nd | vd | effective diameter |
|---|---|---|---|---|---|
| 1* | 154.958 | 3.50 | 1.77250 | 49.6 | 80.01 |
| 2 | 29.515 | 13.26 | | | 55.74 |
| 3 | 59.691 | 3.50 | 1.49710 | 81.6 | 55.12 |
| 4* | 21.978 | 6.87 | | | 43.30 |
| 5 | 104.438 | 2.80 | 1.85400 | 40.4 | 42.65 |
| 6* | 33.401 | 9.18 | | | 33.02 |
| 7 | −52.053 | 2.00 | 1.59522 | 67.7 | 32.89 |
| 8 | 58.197 | 2.63 | | | 31.92 |
| 9 | −633.593 | 1.70 | 1.59522 | 67.7 | 31.94 |
| 10 | 64.481 | 0.15 | | | 32.34 |
| 11 | 47.826 | 6.91 | 1.88300 | 40.8 | 32.92 |
| 12 | −68.507 | (variable) | | | 32.79 |
| 13 (diaphragm) | ∞ | 0.50 | | | 19.08 |
| 14 | 24.007 | 1.00 | 1.91082 | 35.3 | 19.90 |
| 15 | 14.117 | 5.60 | 1.63980 | 34.5 | 19.19 |
| 16 | 291.885 | (variable) | | | 19.13 |
| 17 | 45.984 | 4.52 | 1.53172 | 48.8 | 19.10 |
| 18 | −29.858 | 0.90 | 1.91082 | 35.3 | 18.80 |
| 19 | 83.230 | 0.15 | | | 18.84 |
| 20 | 31.063 | 4.41 | 1.59551 | 39.2 | 19.10 |
| 21 | −49.772 | 1.00 | | | 18.91 |
| 22 | ∞ | (variable) | | | (variable) |
| 23 | −264.017 | 0.90 | 1.83481 | 42.7 | 17.29 |
| 24 | 13.003 | 4.68 | 1.49700 | 81.5 | 16.55 |
| 25 | 123.013 | 0.15 | | | 16.84 |
| 26 | 21.410 | 5.96 | 1.49700 | 81.5 | 17.60 |
| 27 | −19.958 | 0.15 | | | 17.78 |
| 28 | −37.618 | 0.90 | 1.77250 | 49.6 | 17.45 |
| 29 | 14.568 | 6.72 | 1.58313 | 59.4 | 18.14 |
| 30* | −49.967 | | | | 19.37 |

Aspheric data

First surface

K = 0.00000e+000   A4 = 7.88342e−006   A6 = −8.06096e−009
A8 = 7.93046e−012   A10 = −4.23301e−015   A12 = 1.01688e−018

Fourth surface

K = −8.99792e−001   A4 = 2.36970e−006   A6 = −2.99695e−008
A8 = 3.31121e−011   A10 = −9.56668e−014   A12 = 1.00875e−016

Sixth surface

K = −1.27164e+000   A4 = 2.17641e−005   A6 = −1.16704e−009
A8 = 2.38004e−010   A10 = −1.13731e−012   A12 = 2.73008e−015
A14 = −7.14368e−020

Thirtieth surface

K = 2.15251e+000   A4 = 1.73997e−005   A6 = 2.42187e−008
A8 = −1.49596e−010   A10 = 7.48665e−013

-continued (numerical example 3)
unit mm

Various data
Zoom ratio 2.06

| | Wide angle | intermediate | telephoto |
|---|---|---|---|
| Focal length | 11.30 | 18.00 | 23.30 |
| Fno | 4.16 | 4.15 | 4.14 |
| Half angle Of view (°) | 62.42 | 50.24 | 42.87 |
| Image height | 21.64 | 21.64 | 21.64 |
| lens overall length | 170.49 | 158.25 | 158.74 |
| BF | 38.82 | 51.44 | 61.40 |
| d12 | 36.55 | 11.51 | 2.00 |
| d16 | 4.41 | 3.62 | 3.00 |
| d22 | 0.65 | 1.62 | 2.28 |
| ea22 | 11.64 | 15.04 | 17.95 | zoom lens unit data

| unit | starting surface | focal length | lens unit length | front principal point position | back principal point position |
|---|---|---|---|---|---|
| 1 | 1 | −18.81 | 52.50 | 8.9 | −40.38 |
| 2 | 13 | 58.42 | 7.10 | −0.60 | −4.98 |
| 3 | 17 | 53.70 | 10.98 | 3.77 | −3.81 |
| 4 | 23 | −267.84 | 19.47 | −35.12 | −54.73 |

(numerical example 4)
unit mm surface data

| surface number | r | d | nd | vd | effective diameter |
|---|---|---|---|---|---|
| 1* | 130.312 | 3.50 | 1.77250 | 49.6 | 84.00 |
| 2 | 31.800 | 9.06 | | | 60.45 |
| 3 | 40.893 | 3.50 | 1.58313 | 59.4 | 59.92 |
| 4* | 28.341 | 6.81 | | | 52.72 |
| 5* | 44.162 | 2.80 | 1.85400 | 40.4 | 50.20 |
| 6 | 22.356 | 11.81 | | | 37.62 |
| 7 | −151.830 | 2.00 | 1.59522 | 67.7 | 37.19 |
| 8 | 32.259 | 5.59 | | | 33.31 |
| 9 | −269.657 | 1.70 | 1.59522 | 67.7 | 33.26 |
| 10 | 56.161 | 2.13 | | | 33.15 |
| 11 | 47.567 | 6.23 | 1.83400 | 37.2 | 34.12 |
| 12 | −103.398 | (variable) | | | 33.84 |
| 13 (diaphragm) | ∞ | 0.50 | | | 19.33 |
| 14 | 22.995 | 1.00 | 1.91082 | 35.3 | 20.17 |
| 15 | 13.351 | 6.20 | 1.63980 | 34.5 | 19.30 |
| 16 | 180.927 | (variable) | | | 19.21 |
| 17 | 67.633 | 4.22 | 1.54814 | 45.8 | 19.24 |
| 18 | −25.185 | 0.17 | | | 19.08 |
| 19 | −28.675 | 0.80 | 1.91082 | 35.3 | 18.76 |
| 20 | 60.274 | 0.15 | | | 18.80 |
| 21 | 25.254 | 3.24 | 1.59551 | 39.2 | 19.22 |
| 22 | 167.800 | 1.53 | | | 19.04 |
| 23 | ∞ | 0.02 | | | (variable) |
| 24 | 40.878 | 0.90 | 1.83481 | 42.7 | 18.76 |
| 25 | 12.912 | 4.54 | 1.49700 | 81.5 | 17.83 |
| 26 | 63.160 | 0.15 | | | 17.95 |
| 27 | 20.391 | 6.57 | 1.49700 | 81.5 | 18.40 |
| 28 | −21.473 | 0.15 | | | 18.00 |
| 29 | −42.995 | 0.90 | 1.77250 | 49.6 | 16.92 |
| 30 | 14.919 | 4.87 | 1.58313 | 59.4 | 17.51 |
| 31* | −90.284 | | | | 18.22 |

(numerical example 4)
unit mm

Aspheric data

First surface

K = 0.00000e+000   A4 = 6.94782e−006   A6 = −6.13658e−009
A8 = 5.11232e−012   A10 = −2.37027e−015   A12 = 5.04845e−019

Fourth surface

K = −3.65317e−001   A4 = 9.64145e−006   A6 = −2.32268e−008
A8 = 4.17146e−011   A10 = −9.66370e−014   A12 = 6.07626e−017

Fifth surface

K = 1.03867e+000   A4 = −2.01437e−006   A6 = −1.10269e−008
A8 = 2.20578e−011   A10 = −4.71505e−014   A12 = 3.34355e−017
A14 = −6.70766e−021

Thirty-first surface

K = −3.63296e+001   A4 = 2.09015e−005   A6 = 3.75425e−008
A8 = 2.56281e−010   A10 = −2.15932e−013

Various data
Zoom ratio 2.06

|  | Wide angle | intermediate | telephoto |
|---|---|---|---|
| Focal length | 11.30 | 17.33 | 23.30 |
| Fno | 4.10 | 4.10 | 4.10 |
| Half angle Of view (°) | 62.42 | 51.30 | 42.88 |
| Image height | 21.64 | 21.64 | 21.64 |
| Lens overall Length | 170.79 | 160.38 | 161.97 |
| BF | 38.80 | 50.96 | 63.13 |
| d12 | 36.47 | 13.23 | 2.00 |
| d16 | 4.48 | 5.14 | 5.79 |
| ea23 | 12.12 | 15.32 | 18.89 | zoom lens unit data

| unit | starting surface | focal length | lens unit length | front principal point position | back principal point position |
|---|---|---|---|---|---|
| 1 | 1 | −19.30 | 55.13 | 10.54 | −41.93 |
| 2 | 13 | 60.49 | 7.70 | −1.07 | −5.77 |
| 3 | 17 | 76.92 | 28.21 | 8.46 | −11.22 |

(numerical example 5)
unit mm surface data

| surface number | r | d | nd | vd | effective diameter |
|---|---|---|---|---|---|
| 1 | 56.312 | 3.50 | 1.77250 | 49.6 | 89.32 |
| 2* | 38.244 | 4.47 |  |  | 71.49 |
| 3 | 38.870 | 3.50 | 1.58313 | 59.4 | 68.01 |
| 4* | 15.593 | 16.34 |  |  | 54.11 |
| 5 | 99.417 | 2.80 | 1.85400 | 40.4 | 52.14 |
| 6* | 42.615 | 7.83 |  |  | 39.16 |
| 7 | −776.355 | 2.00 | 1.59522 | 67.7 | 38.91 |
| 8 | 28.871 | 7.16 |  |  | 33.52 |
| 9 | −87.686 | 1.70 | 1.59522 | 67.7 | 33.46 |
| 10 | 42.873 | 1.96 |  |  | 33.25 |
| 11 | 44.127 | 7.02 | 1.88300 | 40.8 | 34.38 |
| 12 | −95.316 | (variable) |  |  | 34.11 |
| 13 (diaphragm) | ∞ | 0.50 |  |  | 19.04 |
| 14 | 23.763 | 1.00 | 1.91082 | 35.3 | 19.81 |
| 15 | 13.492 | 5.71 | 1.63980 | 34.5 | 19.02 |
| 16 | 217.234 | (variable) |  |  | 18.97 |
| 17 | 74.209 | 4.53 | 1.54814 | 45.8 | 19.06 |
| 18 | −24.270 | 0.15 |  |  | 18.90 |
| 19 | −26.867 | 0.90 | 1.91082 | 35.3 | 18.64 |
| 20 | 87.166 | 0.15 |  |  | 18.77 |
| 21 | 26.548 | 4.05 | 1.59551 | 39.2 | 19.17 |
| 22 | −169.730 | 1.50 |  |  | 18.93 |
| 23 | ∞ | 0.00 |  |  | (variable) |
| 24 | 62.658 | 0.90 | 1.83481 | 42.7 | 18.31 |
| 25 | 12.870 | 4.64 | 1.49700 | 81.5 | 17.36 |
| 26 | 53.585 | 0.15 |  |  | 17.61 |
| 27 | 21.447 | 6.30 | 1.49700 | 81.5 | 18.43 |
| 28 | −20.357 | 0.15 |  |  | 18.54 |
| 29 | −32.621 | 0.90 | 1.77250 | 49.6 | 18.20 |
| 30 | 14.904 | 6.72 | 1.58313 | 59.4 | 18.88 |
| 31* | −45.303 |  |  |  | 19.84 |

Aspheric data second surface

K = 0.00000e+000   A4 = 1.13417e−005   A6 = −1.81623e−008
A8 = 9.88199e−012   A10 = 2.94560e−015   A12 = −4.09193e−018

Fourth surface

K = −1.20063e+000   A4 = −1.84060e−005   A6 = 6.29694e−008
A8 = 2.25242e−012   A10 = −1.81953e−013   A12 = 1.40860e−016

Sixth surface

K = −8.75669e−001   A4 = 1.49897e−005   A6 = −5.16486e−008
A8 = 3.27081e−010   A10 = −8.48991e−013   A12 = 1.14217e−015
A14 = −7.25330e−020

Thirty-first surface

K = 1.16406e+001   A4 = 2.90717e−005   A6 = 8.11969e−008
A8 = −2.52083e−010   A10 = 3.27569e−012

Various data
Zoom ratio 2.06

|  | Wide angle | intermediate | telephoto |
|---|---|---|---|
| Focal length | 11.30 | 18.00 | 23.30 |
| Fno | 4.10 | 4.10 | 4.10 |
| Half angle Of view (°) | 62.42 | 50.24 | 42.88 |
| Image height | 21.64 | 21.64 | 21.64 |
| Lens overall Length | 178.05 | 166.01 | 167.37 |
| BF | 38.82 | 52.47 | 63.34 |
| d12 | 38.24 | 12.09 | 2.00 |
| d16 | 4.45 | 4.92 | 5.49 |
| ea23 | 12.01 | 15.45 | 18.48 | zoom lens unit data

| unit | starting surface | focal length | lens unit length | front principal point position | back principal point position |
|---|---|---|---|---|---|
| 1 | 1 | −19.73 | 58.28 | 13.64 | −42.06 |
| 2 | 13 | 62.70 | 7.21 | −0.91 | −5.33 |
| 3 | 17 | 74.43 | 31.04 | 11.60 | −10.84 |

(numerical example 6)
unit mm surface data

| surface number | r | d | nd | vd | effective diameter |
|---|---|---|---|---|---|
| 1* | 188.441 | 3.50 | 1.72000 | 50.2 | 86.00 |
| 2* | 34.503 | 25.00 |  |  | 64.06 |

-continued (numerical example 6)
unit mm

| | | | | | |
|---|---|---|---|---|---|
| 3 | 221.461 | 2.80 | 1.85400 | 40.4 | 48.01 |
| 4* | 26.189 | 6.37 | | | 35.25 |
| 5 | 133.252 | 2.00 | 1.59522 | 67.7 | 35.07 |
| 6 | 27.948 | 6.65 | | | 31.38 |
| 7 | −75.735 | 1.70 | 1.59522 | 67.7 | 31.33 |
| 8 | 46.632 | 2.18 | | | 31.60 |
| 9 | 47.302 | 6.77 | 1.88300 | 40.8 | 32.89 |
| 10 | −74.588 | (variable) | | | 32.73 |
| 11 (diaphragm) | ∞ | 0.50 | | | 19.51 |
| 12 | 24.601 | 1.00 | 1.91082 | 35.3 | 20.28 |
| 13 | 13.970 | 5.76 | 1.64769 | 33.8 | 19.50 |
| 14 | 229.511 | (variable) | | | 19.43 |
| 15 | 42.848 | 4.93 | 1.51742 | 52.4 | 19.42 |
| 16 | −26.067 | 0.28 | | | 19.10 |
| 17 | −29.518 | 0.90 | 1.88300 | 40.8 | 18.67 |
| 18 | 75.113 | 0.15 | | | 18.57 |
| 19 | 31.599 | 3.49 | 1.51823 | 58.9 | 18.73 |
| 20 | −601.994 | 1.50 | | | 18.51 |
| 21 | ∞ | 0.00 | | | (variable) |
| 22 | 68.287 | 0.90 | 1.83481 | 42.7 | 18.12 |
| 23 | 13.730 | 4.52 | 1.49700 | 81.5 | 17.43 |
| 24 | 67.404 | 0.15 | | | 17.85 |
| 25 | 21.859 | 6.35 | 1.49700 | 81.5 | 18.98 |
| 26 | −22.270 | 0.15 | | | 19.25 |
| 27 | −52.813 | 0.90 | 1.77250 | 49.6 | 18.95 |
| 28 | 14.484 | 6.32 | 1.58313 | 59.4 | 19.18 |
| 29* | −78.136 | | | | 19.84 |

Aspheric data first surface

K = 0.00000e+000   A4 = 1.10736e−005   A6 = −1.00765e−008
A8 = 7.30781e−012   A10 = −3.08767e−015   A12 = 6.00371e−019

Second surface

K = 0.00000e+000   A4 = 8.11195e−006   A6 = 1.14304e−009
A8 = −7.95403e−012   A10 = 1.10372e−014   A12 = −9.76761e−018

Fourth surface

K = −1.63178e+000   A4 = 1.57587e−005   A6 = −2.60985e−008
A8 = 2.07183e−010   A10 = −5.91105e−013   A12 = 9.30911e−016
A14 = −7.14368e−020

Twenty-ninth surface

K = 1.35957e+001   A4 = 1.95159e−005   A6 = 2.55356e−008
A8 = −1.78625e−010   A10 = 8.89323e−013

Various data
Zoom ratio 2.01

| | Wide angle | intermediate | telephoto |
|---|---|---|---|
| Focal length | 11.60 | 18.00 | 23.30 |
| Fno | 4.10 | 4.10 | 4.10 |
| Half angle Of view (°) | 61.80 | 50.24 | 42.88 |
| Image height | 21.64 | 21.64 | 21.64 |
| Length overall Length | 175.07 | 164.64 | 165.76 |
| BF | 38.82 | 51.65 | 62.51 |
| d10 | 36.86 | 12.29 | 2.00 |
| d14 | 4.61 | 5.92 | 6.48 |
| ea21 | 11.99 | 15.24 | 18.23 | zoom lens unit data

| unit | starting surface | focal length | lens unit length | front principal point position | back principal point position |
|---|---|---|---|---|---|
| 1 | 1 | −19.93 | 56.98 | 12.04 | −43.95 |
| 2 | 11 | 62.63 | 7.26 | −0.83 | −5.27 |
| 3 | 15 | 78.62 | 30.54 | 9.63 | −12.56 |

TABLE 1

| | | Numerical example | | |
|---|---|---|---|---|
| | | 1 | 2 | 3 |
| | Lens unit type | Negative positive positive | Negative positive | Negative positive Negative |
| | fw | 11.300 | 11.300 | 11.301 |
| | ft | 23.299 | 23.300 | 23.303 |
| | f1 | −19.526 | −18.758 | −18.815 |
| | BLD1 | 54.596 | 56.467 | 52.505 |
| | R1 | 54.936 | 51.007 | 55.411 |
| | R2 | 26.814 | 27.584 | 24.718 |
| | D12 | 24.755 | 29.700 | 27.137 |
| (1) | R1/BLD1 | 1.006 | 0.903 | 1.055 |
| (2) | D12/BLD1 | 0.453 | 0.526 | 0.517 |
| (3) | R2/BLD1 | 0.491 | 0.488 | 0.471 |
| (4) | |f1|fw | 1.728 | 1.660 | 1.665 |
| | First aspheric lens | | | |
| | Ar1 | 1.637 | 1.513 | 1.828 |
| | Ar2 | 0.000 | 0.950 | 0.000 |
| | Ea1 | 83.997 | 84.004 | 80.007 |
| | Ea2 | 60.739 | 65.044 | 55.743 |
| | Nd | 1.772 | 1.772 | 1.772 |
| | Asp | 1.637 | 2.463 | 1.828 |
| (xa), (xb) | (Ar1/Ea1 + Ar2/Ea2) × Nd | 0.035 | 0.058 | 0.040 |
| | Second aspheric lens | | | |
| | Ar1 | 0.000 | 0.000 | 0.000 |
| | Ar2 | −0.506 | −0.554 | −0.410 |
| | Ea1 | 50.357 | 45.974 | 42.646 |
| | Ea2 | 37.866 | 34.540 | 33.019 |
| | Nd | 1.854 | 1.854 | 1.854 |
| | Asp | −0.506 | −0.554 | −0.410 |
| (xa), (xb) | (Ar1/Ea1 + Ar2/Ea2) × Nd | −0.025 | −0.030 | −0.023 |
| | Third aspheric lens | | | |
| | Ar1 | 0.000 | 0.000 | 0.000 |
| | Ar2 | 1.536 | 1.596 | 0.975 |
| | Ea1 | 60.110 | 63.800 | 55.124 |
| | Ea2 | 51.436 | 47.699 | 43.295 |
| | Nd | 1.583 | 1.497 | 1.497 |
| | Asp | 1.536 | 1.596 | 0.975 |
| (xa), (xb) | (Ar1/Ea1 + Ar2/Ea2) × Nd | 0.047 | 0.050 | 0.034 |

| | | Numerical example | | |
|---|---|---|---|---|
| | | 4 | 5 | 6 |
| | Lens unit type | Negative positive positive | Negative positive positive | Negative positive positive |
| | fw | 11.300 | 11.300 | 11.600 |
| | ft | 23.300 | 23.296 | 23.299 |
| | f1 | −19.305 | −19.726 | −19.930 |
| | BLD1 | 55.134 | 58.283 | 56.976 |
| | R1 | 55.694 | 56.313 | 53.293 |
| | R2 | 22.356 | 29.618 | 24.849 |
| | D12 | 22.868 | 27.810 | 28.500 |
| (1) | R1/BLD1 | 1.010 | 0.966 | 0.935 |
| (2) | D12/BLD1 | 0.415 | 0.477 | 0.500 |
| (3) | R2/BLD1 | 0.405 | 0.508 | 0.436 |
| (4) | |f1|fw | 1.708 | 1.746 | 1.718 |
| | First aspheric lens | | | |
| | Ar1 | 1.609 | 0.000 | 1.648 |
| | Ar2 | 0.000 | 1.421 | 1.492 |
| | Ea1 | 84.004 | 89.325 | 86.003 |
| | Ea2 | 60.454 | 71.491 | 64.060 |
| | Nd | 1.772 | 1.772 | 1.720 |
| | Asp | 1.609 | 1.421 | 3.140 |
| (xa), (xb) | (Ar1/Ea1 + Ar2/Ea2) × Nd | 0.034 | 0.035 | 0.073 |

TABLE 1-continued

Second aspheric lens

|  |  | | | |
|---|---|---|---|---|
|  | Ar1 | −0.516 | 0.000 | 0.000 |
|  | Ar2 | 0.000 | −0.661 | −0.113 |
|  | Ea1 | 50.200 | 52.143 | 48.007 |
|  | Ea2 | 34.616 | 39.165 | 35.252 |
|  | Nd | 1.854 | 1.854 | 1.854 |
|  | Asp | −0.516 | −0.661 | −0.113 |
| (xa), (xb) | (Ar1/Ea1 + Ar2/Ea2) × Nd | −0.019 | −0.031 | −0.006 |

Third aspheric lens

|  |  | | | |
|---|---|---|---|---|
|  | Ar1 | 0.000 | 0.000 | — |
|  | Ar2 | 1.318 | 2.413 | — |
|  | Ea1 | 59.920 | 68.088 | — |
|  | Ea2 | 52.716 | 54.105 | — |
|  | Nd | 1.583 | 1.583 | — |
|  | Asp | 1.318 | 2.413 | — |
| (xa), (xb) | (Ar1/Ea1 + Ar2/Ea2) × Nd | 0.040 | 0.071 | — |

Referring now to FIG. 14, a description will be given of an embodiment to which an image-pickup apparatus that includes a zoom lens according to one of the first to sixth embodiments. The image-pickup apparatus according to the present invention includes an interchangeable lens unit that contains a zoom lens, and a camera body detachably connected to the interchangeable lens unit through a camera mount, and including an image sensor configured to receive an optical image formed by the zoom lens and to convert it into an electric image signal.

FIG. 14 is a schematic view of a principal part of the single-lens reflex camera. Reference numeral 10 denotes an image-pickup lens having the zoom lens 1 according to one of the first to sixth embodiments. The zoom lens 1 is held by a barrel 2 as a holder. Reference numeral 20 denotes a camera body including a quick return mirror 3 configured to upwardly reflect a light flux from the image-pickup lens 10, a focus plate 4 arranged in an imaging unit of the image-pickup lens 10, a penta-Dach mirror prism 5 configured to convert an erect image into an inverted image formed on the focus plate 4, an eyepiece 6 used to observe the erect image, etc.

Reference numeral 7 denotes a photosensitive plane, on which a solid state image-pickup element (photoelectric converter), such as a CCD sensor and a CMOS sensor, and a film based film. At the image-pickup time, the quick return mirror 3 is retreated from the optical path, and the image is formed on the photosensitive plane 7 by the image-pickup lens 10. The image-pickup apparatus disclosed in this embodiment can effectively provide the advantages described in the first to sixth embodiments. The image-pickup apparatus is also applicable to the mirror-less single-lens reflex camera that has no quick return mirror 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146654, filed Jun. 29, 2012, which is hereby incorporated by reference herein in its entirety.

What is claimed is:

1. A zoom lens comprising, in order from an object side to an image side:
a first lens unit having a negative refractive power; and
a rear lens group having a positive total refractive power and comprising at least one lens unit configured to have an interval between the first lens unit and the rear lens group at a telephoto end of the zoom lens smaller than another interval between the first lens unit and the rear lens group at a wide angle end of the zoom lens,
wherein the first lens unit comprises three negative meniscus lenses consecutively arranged in order from a position closest to the object side to the image side, and
wherein the following conditional expressions are satisfied:

$$0.50 < R1/BLD1 < 2.50$$

$$0.30 < D12/BLD1 < 0.80$$

where when a lens located closest to the object side of the first lens unit and having an aspheric surface with a positive aspheric amount is defined as a first aspheric lens and a lens located on the image side of the first aspheric lens and having an aspheric surface with a negative aspheric amount is defined as a second aspheric lens, R1 denotes, in a case that a lens surface on the object side of the first aspheric lens is a spherical shape, a radius of curvature of the lens surface and in a case that a lens surface on the object side of the first aspheric lens is an aspheric shape, a radius of curvature of a radius of a reference spherical surface D12 denotes an interval along an optical axis from an object-side lens surface of the first aspheric lens to an object-side lens surface of the second aspheric lens, and BLD1 denotes the length of the first lens unit.

2. The zoom lens according to claim 1, wherein the first aspheric lens comprises a negative meniscus lens with a convex surface on the object side.

3. The zoom lens according to claim 1, wherein both the lens surfaces on the object side and on the image side in the first aspheric lens are aspheric, and the lens surface on the object side has an aspheric amount larger than that of the aspheric surface on the image side.

4. The zoom lens according to claim 1, wherein the second aspheric lens is a negative lens having a concave surface on the image side.

5. The zoom lens according to claim 1, wherein the following conditional expression is satisfied:

$$0.30 < R2/BLD1 < 0.80$$

where R2 denotes, in a case that a lens surface on the object side of the second aspheric lens is a spherical shape, a radius curvature of the lens surface and in a case that a lens surface on the object side of the second aspheric lens is an aspheric shape, a radius of curvature of a radius of a reference spherical surface.

6. The zoom lens according to claim 1, further comprising a third aspheric lens located on the optical axis between the first aspheric lens and the second aspheric lens having a positive aspheric amount.

7. The zoom lens according to claim 1, wherein the following conditional expression is satisfied:

$$1.00 < |f1|/fw < 2.50$$

where f1 denotes a focal length of the first lens unit, and fw denotes a focal length of an overall system at a wide angle end.

8. The zoom lens according to claim 1, wherein the rear lens group comprises, in order from the object side to the image side, a second lens unit having a positive refractive power, and a third lens unit having a positive refractive power, wherein in zooming from a wide angle end to a telephoto end, the second lens unit and the third lens unit are configured to move towards the object side.

9. The zoom lens according to claim 1, wherein the rear lens group includes, in order from the object side to the image side, a second lens unit having a positive refractive power, a third lens unit having a positive refractive power, and a fourth lens unit having a negative refractive power, wherein in zooming from a wide angle end to a telephoto end, the second lens unit, the third lens unit, the fourth lens unit are configured to move towards the object side.

10. The zoom lens according to claim 1, wherein the rear lens group includes a second lens unit having a positive refractive power, wherein in zooming from a wide angle end to a telephoto end, the second lens unit is configured to move toward the object side.

11. An image-pickup apparatus comprising a zoom lens comprising, in order from an object side to an image side:
    a first lens unit having a negative refractive power; and
    a rear lens group having a positive total refractive power and comprising at least one lens unit configured to have an interval between the first lens unit and the rear lens group at a telephoto end of the zoom lens smaller than another interval between the first lens unit and the rear lens group at a wide angle end of the zoom lens,
    wherein the first lens unit comprises three negative meniscus lenses consecutively arranged in order from a position closest to the object side to the image side, and
    wherein the following conditional expressions are satisfied:

$0.50 < R1/BLD1 < 2.50$ $0.30 < D12/BLD1 < 0.80$ where when a lens located closest to the object side of the first lens unit and having an aspheric surface with a positive aspheric amount is defined as a first aspheric lens and a lens located on the image side of the first aspheric lens and having an aspheric surface with a negative aspheric amount is defined as a second aspheric lens, R1 denotes in a case that a lens surface on the object side of the first aspheric lens is a spherical shape, a radius of curvature of the lens surface and in a case that a lens surface on the object side of the first aspheric lens is an aspheric shape, a radius of curvature of a radius of a reference spherical surface, D12 denotes an interval along an optical axis from an object-side lens surface of the first aspheric lens to an object-side lens surface of the second aspheric lens, and BLD1 denotes the length of the first lens unit.

12. A zoom lens comprising, in order from an object side to an image side:
    a first lens unit having a negative refractive power; and
    a rear lens group having a positive total refractive power and comprising at least one lens unit configured to have an interval between the first lens unit and the rear lens group at a telephoto end of the zoom lens smaller than another interval between the first lens unit and the rear lens group at a wide angle end of the zoom lens,
    wherein the first lens unit comprises a first aspheric lens located furthest towards the object side and having an aspheric surface with a positive aspheric amount, and a second aspheric lens located on the image side of the first aspheric lens having an aspheric surface with a negative aspheric amount,
    wherein the first lens unit further comprises a third aspheric lens located on an optical axis between the first aspheric lens and the second aspheric lens having a positive aspheric amount, and
    wherein the following conditional expressions are satisfied:

$0.50 < R1/BLD1 < 2.50$ $0.30 < D12/BLD1 < 0.80$ where R1 denotes in a case that a lens surface on the object side of the first aspheric lens is a spherical shape, a radius of curvature of the lens surface and in a case that a lens surface on the object side of the first aspheric lens is an aspheric shape, a radius of curvature of a radius of a reference spherical surface, D12 denotes an interval along an optical axis from the object side surface of the first aspheric lens to an object-side surface of the second aspheric lens, and BLD1 denotes the length of the first lens unit.

* * * * *